United States Patent
Lukyanov et al.

(10) Patent No.: US 10,061,592 B2
(45) Date of Patent: Aug. 28, 2018

(54) ARCHITECTURE AND EXECUTION FOR EFFICIENT MIXED PRECISION COMPUTATIONS IN SINGLE INSTRUCTION MULTIPLE DATA/THREAD (SIMD/T) DEVICES

(71) Applicant: SAMSUNG ELECTRONICS COMPANY, LTD., Suwon, Gyeonggi-Do (KR)

(72) Inventors: Maxim Lukyanov, Sunnyvale, CA (US); Alexander Grosul, Santa Clara, CA (US); Mitchell Alsup, Austin, TX (US); Boris Beylin, Palo Alto, CA (US)

(73) Assignee: Samsung Electronics Co., Ltd. (KR)

( * ) Notice: Subject to any disclaimer, the term of this patent is extended or adjusted under 35 U.S.C. 154(b) by 322 days.

(21) Appl. No.: 14/672,694

(22) Filed: Mar. 30, 2015

(65) Prior Publication Data
US 2015/0378741 A1    Dec. 31, 2015

Related U.S. Application Data

(60) Provisional application No. 62/018,354, filed on Jun. 27, 2014.

(51) Int. Cl.
*G06F 15/76* (2006.01)
*G06F 9/38* (2018.01)
(Continued)

(52) U.S. Cl.
CPC ............ *G06F 9/3887* (2013.01); *G06F 8/443* (2013.01); *G06F 9/30014* (2013.01);
(Continued)

(58) Field of Classification Search
CPC .... G06F 9/3887; G06F 8/443; G06F 9/30014; G06F 9/30018; G06F 9/30036; G06F 9/3851; G06F 9/46
See application file for complete search history.

(56) References Cited

U.S. PATENT DOCUMENTS 5,966,528 A    10/1999  Wilkinson et al.
6,748,521 B1 *  6/2004  Hoyle ................. G06F 9/30014
                                                     708/508
(Continued)

FOREIGN PATENT DOCUMENTS

EP    0570950 A2    11/1993
EP    1616289 A4    4/2008
(Continued)

OTHER PUBLICATIONS

Patterson, David A., and John L. Hennessy. Computer Organization and Design: The Hardware/Software Interface. 3rd ed. Burlington, MA: Morgan Kaufmann, n.d. Print. (3rd Edition pp. 63, 108, 140-143, 304, 381-382, 421-423, C-10, All of Section C.4, C-27, C-28, C-29).*

(Continued)

*Primary Examiner* — Aimee Li
*Assistant Examiner* — Andrew J Cromer
(74) *Attorney, Agent, or Firm* — Innovation Counsel LLP

(57) ABSTRACT

A method for improving power, performance, area (PPA) for mixed precision computations in a processing environment. The method includes determining a braiding factor as a number of units of work encoded into a physical thread. A value of the braiding factor is determined based on a mix of precision requirements presented for individual units of work. Units of work are classified as instructions for applied code transformation based on associated precision requirements for the processing environment. Instruction inputs from specified registers are packed together into a destination register according to the determined value of the braiding factor. The packed instructions presented in vector form are executed with an instruction set architecture configured for executing packed instructions of different precisions.

24 Claims, 22 Drawing Sheets

(51) Int. Cl.
  *G06F 9/30* (2018.01)
  *G06F 9/46* (2006.01)
  *G06F 8/41* (2018.01)
(52) U.S. Cl.
  CPC ...... *G06F 9/30018* (2013.01); *G06F 9/30036* (2013.01); *G06F 9/3851* (2013.01); *G06F 9/46* (2013.01)

(56) References Cited

U.S. PATENT DOCUMENTS

| | | | |
|---|---|---|---|
| 7,081,902 B1 | 7/2006 | Crow et al. | |
| 7,100,164 B1 | 8/2006 | Edwards | |
| 7,676,653 B2* | 3/2010 | May | G06F 9/30134 712/210 |
| 8,082,425 B2* | 12/2011 | Sudhakar | G06F 9/3824 712/226 |
| 8,140,830 B2 | 3/2012 | Schwinn et al. | |
| 8,190,669 B1* | 5/2012 | Oberman | G06F 7/5443 708/230 |
| 8,190,807 B2 | 5/2012 | Reid et al. | |
| 8,392,669 B1 | 3/2013 | Nyland et al. | |
| 8,416,468 B2 | 4/2013 | Underwood et al. | |
| 8,423,983 B2 | 4/2013 | Gschwind | |
| 8,677,105 B2 | 3/2014 | Abdallah et al. | |
| 8,751,771 B2 | 6/2014 | Fahs et al. | |
| 8,752,018 B2 | 6/2014 | Jones et al. | |
| 9,898,288 B2* | 2/2018 | Lu | G06F 9/3009 |
| 2008/0098207 A1 | 4/2008 | Reid et al. | |
| 2009/0150890 A1 | 6/2009 | Yourst et al. | |
| 2009/0293061 A1 | 11/2009 | Schwinn et al. | |
| 2010/0023733 A1* | 1/2010 | Moore | G06F 9/30181 712/221 |
| 2010/0161948 A1 | 6/2010 | Abdallah | |
| 2011/0022817 A1 | 1/2011 | Gaster et al. | |
| 2011/0078415 A1* | 3/2011 | Johnson | G06F 9/30021 712/208 |
| 2012/0089655 A1* | 4/2012 | Erinjippurath | G06F 8/447 708/204 |
| 2012/0246657 A1 | 9/2012 | Abdallah | |
| 2012/0259843 A1 | 10/2012 | Child | |
| 2013/0042090 A1 | 2/2013 | Krashinsky | |
| 2013/0113809 A1 | 5/2013 | Kong et al. | |
| 2013/0198494 A1 | 8/2013 | Grover et al. | |
| 2013/0262831 A1* | 10/2013 | Nelson | G06F 9/30 712/215 |
| 2014/0130052 A1 | 5/2014 | Lin et al. | |
| 2014/0149719 A1 | 5/2014 | Tabaru | |
| 2014/0181475 A1 | 6/2014 | Abdallah | |
| 2014/0201450 A1* | 7/2014 | Haugen | G06F 17/16 711/125 |
| 2015/0178879 A1* | 6/2015 | Palmer | G06F 9/505 345/506 |
| 2015/0324198 A1* | 11/2015 | Alsup | G06F 9/30069 712/233 |
| 2015/0324228 A1* | 11/2015 | Alsup | G06F 9/30145 712/226 |
| 2015/0324949 A1* | 11/2015 | Alsup | G06F 9/30145 345/522 |
| 2015/0378733 A1* | 12/2015 | Beylin | G06F 9/3887 712/226 |

FOREIGN PATENT DOCUMENTS

| | | |
|---|---|---|
| EP | 2291737 A2 | 3/2011 |
| WO | 2006029297 A2 | 3/2006 |

OTHER PUBLICATIONS

Liu, T. et al., "DTHREADS: Efficient and Deterministic Multi-threading", Proceedings of the 23rd ACM Symposium on Operating Systems Principles (SOSP'11), Oct. 23, 2011, pp. 327-336, ACM, United States.

Perrone, L.F. et al., "The Design of an Output Data Collection Framework for NS-3", Proceedins of the 2013 Winter Simulation Conference (WSC), Dec. 8-11, 2013, pp. 2984-2995, IEEE, United States.

Van De Loosdrecht, J., "Accelerating Sequential Computer Vision Algorithms Using Commodity Parallel Hardware", Sep. 2013, pp. 1-287, Instituid Teichneloaiochta Luimnigh, Netherlands.

* cited by examiner

Original code:                                    ← 800

FMAD.32 FV, C3, T1, FV
FMAD.32 FV, C11, T2, FV
FMAD.32 O3, C15, T3, FV
FMUL.16.DAB O7, R11, C19
FMUL.16.DAB T4, R9, C17
FMUL.16.DAB T5, R8, C16
FMUL.16.DAB FV, R10, C18
FMUL.16.DAB O6, FV, C20
FMUL.16.DAB O5, T4, C20
FMUL.16.DAB O4, T5, C20
MOV.16 O9, R13
MOV.16 O8, R12

FIG. 8

Braided code                                      ← 900

FMAD.32.A T1, C3, <R0>, T7      ⎫
FMAD.32.B T2, C3, <R0>, T0      ⎪
FMAD.32.A T3, C11, R2, T1       ⎬ 910
FMAD.32.B T4, C11, R6, T2       ⎪ Replicated
FMAD.32.A O3, C15, R3, T3       ⎪
FMAD.32.B O3, C15, T5, T4       ⎭
FMUL.16.DAB.AB O7, R11, C19     ⎫
FMUL.16.DAB.AB T6, R9, C17      ⎪
FMUL.16.DAB.AB T7, R8, C16      ⎪
FMUL.16.DAB.AB FV, R10, C18     ⎪
FMUL.16.DAB.AB O6, FV, C20      ⎬ 920
FMUL.16.DAB.AB O5, T6, C20      ⎪ Vectorized
FMUL.16.DAB.AB O4, T7, C20      ⎪
MOV.16.AB O9, R13               ⎪
MOV.16.AB O8, R12               ⎭

FIG. 9

| Tid | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|---|
| A | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 1 | 0 | 0 | 0 | 0 | 0 | 0 | 0 | 0 | 0 |
| B | 1 | 1 | 1 | 1 | 1 | 1 | 1 | 1 | 1 | 1 | 1 | 1 | 1 | 1 | 1 | 1 | 1 | 1 | 1 | 1 | 1 | 0 | 0 | 0 | 0 | 0 | 0 | 0 | 0 | 0 | 0 | 0 |
| C | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| D | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

FIG. 11

```
.version 1.0
    .text
@main:
    .function
    .type pixel
    .items 2
@T0_0:
    THDR .size=27
@BB0_0:
EXECMSK.SWP.FQ {S0, S1}, eMask
INTRP_LNR.16.A.B R4, 0, 3                       // mediump gl_Position (Braid-12)
    •
    •
    •
FMUL.16.A.B T3, T7, FV                          // mediump (NormCoords.y) (Braid-12)
FMUL.16.A.B T4, T2, FV                          // mediump (NormCoords.x*(1-NormCoords.x)*NormCoords.y) (Braid-12)
FADD.16.A.B FV, FP_ONE, -T3                     // mediump (1-NormCoords.y) (Braid-12)
FMUL.16.A.B FV, T4, FV                          // mediump (NormCoords.x*(1-NormCoords.x)*NormCoords.y*(1-NormCoords.y) (Braid-12)
FMAD.16.A.B T5, FV, R25, FP_ONE                 // mediump (EdgeMask = (Previous*-8.0) + 1.0) (Braid-12)
FMUL.16.A.B FV, FV, FV                          // mediump (EdgeMask^2) (Braid-12)
FMUL.16.A.B FV, FV, T5                          // mediump (EdgeMask^3) (Braid-12)
FMUL.16.A.B FV, FV, T5                          // mediump (EdgeMask^4) (Braid-12)
FMAD.16.A.B R17, FV, R18,                       // mediump EdgeMask=(EdgeMask^4)*0.7 + 0.3 (Braid-12)
FMTC.32.16.A.B {R19, R20} R17                   // highp upconvert EdgeMask (Braid-12)
FADD.32.A R21, FP_ONE, -R19                     // highp (1.0-EdgeMask).A (Braid-1)
    FADD.32.B R22, FP_ONE, -R20                 // highp (1.0-EdgeMask).B (Braid-2)
FMTC.32.16.A.B {R23, R24} R26                   // highp upconvert TexSpaceBlurOrig.x (Braid-12)
FMTC.32.16.A.B {R25, R26} R30                   // highp upconvert AspRatioAndInvAspfRatio.z (Braid-12)
FMTC.32.16.A.B {R27, R28} R32                   // highp upconvert TexCoord.x*(1/gl_Position.w) (Braid-12)
FMAD.32.A T0, R27, -R25, R23                    // highp (TexCoordCorr.x*(-AspRatioAndInvAsptRatio.z) + TexSpaceBlurOrig.x (Braid-1)
    FMAD.32.B T5, R28, -R26, R24                // highp (TexCoordCorr.x*(-AspRatioAndInvAsptRatio.z) + TexSpaceBlurOrig.x (Braid-2)
FMTC.32.16.A.B {R29, R30} R27                   // highp upconvert TexSpaceBlurOrig.y (Braid-12)
    •
    •
    •
```

Control-flow (if-then...)

```
EXECMSK.SWP {S0, S1}, eMask      // Save original masks
FCMP.32.GE.A S2, R0, FP_HALF     // highp Compute condition (Braid-1)
    FCMP.32.GE.B S3, R1, FP_HALF // highp Compute condition (Braid-2)
AND.32.A S5, ~S2, S0             // Compute "else" mask.A (Braid-1)
    AND.32.B S6, ~S3, S1         // Compute "else" mask.B (Braid-2)
AND.32.A S2, S2, S0              // Compute "then" mask.A (Braid-1)
    AND.32.B S3, S3, S1          // Compute "then" mask.B (Braid-2)
OR.32.A|B S7, S5, S6             // Relies on 0 being written into S4 if A|B == 0
OR.32.A|B _, S2, S3              // Relies on 0 being written into S4 if A|B == 0
CMP.32 _, FS, 0                  // "else" condition is (mask.A|mask.B) == 0
B.NEAR @BB_ELSE, FS
@BB_THEN:
FMUL.16.A.B T1, T0, R2           // mediump (Braid-1)
FMTC.32.16.A.B {R3, R4} T1       // highp upconvert (Braid-12)
FADD.32.A R21, FP_ONE, -R19      // highp (Braid-1)
    FADD.32.B R22, FP_ONE, -R20  // highp (Braid-2)
 . . .
@BB_ELSE:
CMP S7, S7, 0
B.NEAR @BB_COND_END, S7
FMUL.16.A.B T1, T0, R2           // mediump (Braid-1)
FMTC.32.16.A.B {R3, R4} T1       // highp upconvert (Braid-12)
FMUL.32.A R21, FP_ONE, -R19      // highp (Braid-1)
    FMUL.32.B R22, FP_ONE, -R20  // highp (Braid-2)
 . . .
@BB_COND_END:
EXECMSK _, {S0, S1}              // Restore execution mask
```

FIG. 14A

Control-flow (if-then...)

```
FCMP.32.EM0,GE.A S4, R0, FP_HALF,THEN    // highp Compute condition (Braid-1)
FCMP.32.EM1,GE.B S5, R1, FP_HALF,THEN    // highp Compute condition (Braid-2)
@BB_THEN:
FMUL.16.EM01 T1, T0, R2                  // mediump (Braid-1)
FMTC.32.16.EM0 R3, T1                    // highp upconvert (Braid-12) lower 16 to 32
FMTC.32.16.EM1 R4, T1                    // highp upconvert (Braid-12) upper 16 to 32
FADD.32.EM0 R21, FP_ONE, -R19            // highp (Braid-1)
FADD.32.EM1 R22, FP_ONE, -R20            // highp (Braid-2)
• • •
@BB_ELSE:
ELSE.32.EM01 S4                          // transition from THEN clause to ELSE clause
FMUL.16.EM01 T1, T0, R2                  // mediump (Braid-1)
FMTC.32.16.EM0 R3, T1                    // highp upconvert (Braid-12) lower 16 to 32
FMTC.32.16.EM1 R4, T1                    // highp upconvert (Braid-12) upper 16 to 32
FMUL.32.EM0 R21, FP_ONE, -R19            // highp (Braid-1)
FMUL.32.EM1 R22, FP_ONE, -R20            // highp (Braid-2)
• • •
@BB_COND_END:
ENDIF.32.EM01 S0                         // Restore execution mask
```

Control-flow (do-while...)

← 1500

```
@BB_LOOP_PREHEADER:
    MOV S0, ZERO
    MOV S1, ZERO
@BB_LOOP:
    AND.32.A eMask, eMask, ~S0          // Compute "iteration" mask.A (Braid-1)
    AND.32.B eMask, eMask, ~S1          // Compute "iteration" mask.B (Braid-2)
    FMUL.16.A.B T1, R1, R0              // mediump (Braid-12)
    FMTC.32.16.A.B {R2, R3} T1          // highp upconvert (Braid-12)
    FADD.32.A R0, FP_ONE, -R2           // highp (Braid-1)
    FADD.32.B R1, FP_ONE, -R3           // highp (Braid-2)
    • •
    FCMP.32.GE.A S0, R0, FP_HALF        // highp Compute condition (Braid-1)
    FCMP.32.GE.B S1, R1, FP_HALF        // highp Compute condition (Braid-2)
    OR.32.A|B __, ~S0, ~S1              // Any thread wants another iteration?
    CMP.32 __, FS, 0                    //
    B.NEAR @BB_LOOP, FS                 // Continue or exit the loop
@BB_LOOP_EXIT::
    EXECMSK __, {S0, S1}                // Restore execution mask
```

FIG. 15A

Control-flow (do-while...) ~1550

```
@BB_LOOP_PREHEADER:
@BB_LOOP:
    FMUL.16.EM01 T1, R1, R0:              // mediump (Braid-12)
    FMTC.32.16.EM0 R2, T1                 // highp upconvert (Braid-12) lower 16 to 32
    FMTC.32.16.EM1 R3, T1                 // highp upconvert (Braid-12) upper 16 to 32
    FADD.32.EM0 R0, FP_ONE, -R2           // highp (Braid-1)
    FADD.32.EM1 R1, FP_ONE, -R3           // highp (Braid-2)
    •
    •
    •
    FCMP.32.GE.EM0 S4, R0, FP_HALF,LOOP   // highp Compute condition (Braid-1)
    FCMP.32.GE.EM1 S5, R1, FP_HALF,LOOP   // highp Compute condition (Braid-2)
    BB.NEAR.16.EM01 S4, @BB_LOOP, FS      // Continue or exit the loop
@BB_LOOP_EXIT:                            // EM restored when BBackwards fails
```

ARCHITECTURE AND EXECUTION FOR EFFICIENT MIXED PRECISION COMPUTATIONS IN SINGLE INSTRUCTION MULTIPLE DATA/THREAD (SIMD/T) DEVICES

CROSS-REFERENCE TO RELATED APPLICATION

This application claims the priority benefit of U.S. Provisional Patent Application Ser. No. 62/018,354, filed Jun. 27, 2014, which is incorporated herein by reference in its entirety.

TECHNICAL FIELD

One or more embodiments generally relate to a single-instruction multiple data/thread (SIMD/T) processing environments and, in particular, to improving power, performance, area (PPA) for mixed precision computations in a SIMD/T processing environment.

BACKGROUND

In a SIMD/T execution model, multiple different physical threads (SIMD channels) execute the same code with different input data. This execution model is widely used in graphical processing unit (GPU) hardware (HW) both for graphics and, with the increase of general-purpose computing on graphics processing units (GPGPU) programming, for many non-graphical applications.

SUMMARY

One or more embodiments generally relate to improving power, performance, area (PPA) for mixed precision computations in a processing environment (e.g., a SIMT/D processing environment). In one embodiment, a method provides for determining a braiding factor as a number of units of work encoded into a physical thread. A value of the braiding factor is determined based on a mix of precision requirements presented for individual units of work. Units of work are classified as instructions for applied code transformation based on associated precision requirements for the processing environment. Instruction inputs from specified registers are packed together into a destination register according to the determined value of the braiding factor. The packed instructions presented in vector form are executed with an instruction set architecture configured for executing packed instructions of different precisions.

In one embodiment a non-transitory computer-readable storage medium embodied thereon instructions being executable by at least one processor to perform a method for improving power, performance, area (PPA) for mixed precision computations in a processing environment, the method comprising: determining a braiding factor as a number of units of work encoded into a physical thread. A value of the braiding factor is determined based on a mix of precision requirements presented for individual units of work. Units of work are classified as instructions for applied code transformation based on associated precision requirements for the processing environment. Instruction inputs from specified registers are packed together into a destination register according to the determined value of the braiding factor. The packed instructions presented in vector form are executed with an instruction set architecture configured for executing packed instructions of different precisions.

In one embodiment, a graphics processor for an electronic device comprises: one or more processing elements coupled to a memory device. In one embodiment, the one or more processing elements: determine a braiding factor as a number of units of work encoded into a physical thread; determine a value of the braiding factor based on a mix of precision requirements presented for individual units of work; classify units of work as instructions for applied code transformation based on associated precision requirements for the processing environment; pack instruction inputs from specified registers together into a destination register according to the determined value of the braiding factor; and execute the packed instructions presented in vector form with an instruction set architecture configured for executing packed instructions of different precisions.

These and other aspects and advantages of one or more embodiments will become apparent from the following detailed description, which, when taken in conjunction with the drawings, illustrate by way of example the principles of the one or more embodiments.

BRIEF DESCRIPTION OF THE DRAWINGS

For a fuller understanding of the nature and advantages of the embodiments, as well as a preferred mode of use, reference should be made to the following detailed description read in conjunction with the accompanying drawings, in which:

FIG. 8 shows an example of instruction code.

FIG. 9 shows an example of the original instruction code of FIG. 8 transformed into braided code, according to an embodiment.

FIG. 11 shows an example of a 128-bit mask table per warp, according to an embodiment.

FIG. 13 shows an example of transformed code, according to an embodiment.

FIG. 14A shows an example of control-flow for if-then-else code, according to an embodiment.

FIG. 14B shows another example of control-flow for if-then-else code, according to an embodiment.

FIG. 15A shows an example of control-flow for do-while code, according to an embodiment.

FIG. 15B shows another example of control-flow for do-while code, according to an embodiment.

DETAILED DESCRIPTION

The following description is made for the purpose of illustrating the general principles of one or more embodiments and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

One or more embodiments generally relate to improving PPA for mixed precision computations in a SIMT/D processing environment. One or more embodiments offer an approach to SIMD/T execution of mixed precision computations and specify architectural features required for efficient implementation. One or more embodiments reduce power consumption and total instruction count required for handling mixed precision workloads and at the same time increase GPU throughput by efficient use of a register file.

In a SIMD/T execution model, multiple different physical threads (SIMD channels) execute the same code with different input data. This execution model is widely used in GPU HW both for graphics and computing applications. Conventionally, one physical thread (SIMD channel) executes work "on behalf" of one single data element (pixel, vertex or work group item). Some APIs allow a user to specify different precision qualifiers for variables used in a program. Therefore, computations performed on those variables may require different precision.

In one embodiment, a method provides for determining a braiding factor as a number of units of work encoded into a physical thread. A value of the braiding factor is determined based on a mix of precision requirements presented for individual units of work. Units of work are classified as instructions for applied code transformation based on associated precision requirements for the processing environment. Instruction inputs from specified registers are packed together into a destination register according to the determined value of the braiding factor. The packed instructions presented in vector form are executed with an instruction set architecture configured for executing packed instructions of different precisions.

Figure 1:
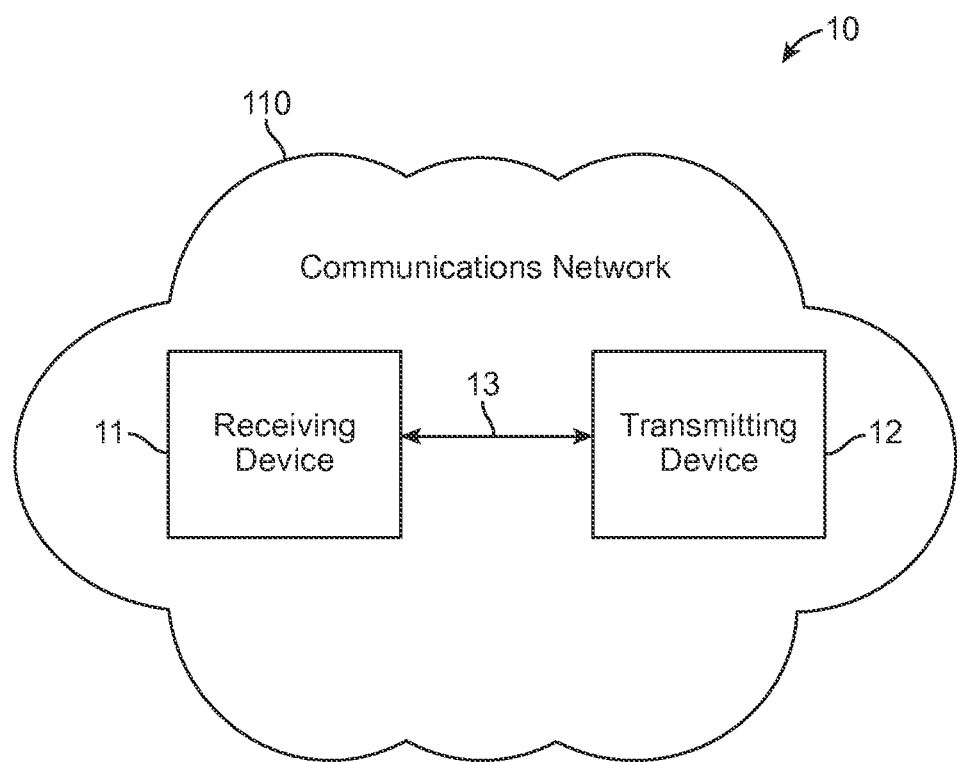
FIG. 1 shows a schematic view of a communications system, according to an embodiment.

FIG. 1 is a schematic view of a communications system 10, in accordance with one embodiment. Communications system 10 may include a communications device that initiates an outgoing communications operation (transmitting device 12) and a communications network 110, which transmitting device 12 may use to initiate and conduct communications operations with other communications devices within communications network 110. For example, communications system 10 may include a communication device that receives the communications operation from the transmitting device 12 (receiving device 11). Although communications system 10 may include multiple transmitting devices 12 and receiving devices 11, only one of each is shown in FIG. 1 to simplify the drawing.

Any suitable circuitry, device, system or combination of these (e.g., a wireless communications infrastructure including communications towers and telecommunications servers) operative to create a communications network may be used to create communications network 110. Communications network 110 may be capable of providing communications using any suitable communications protocol. In some embodiments, communications network 110 may support, for example, traditional telephone lines, cable television, Wi-Fi (e.g., an IEEE 802.11 protocol), BLUETOOTH®, high frequency systems (e.g., 900 MHz, 2.4 GHz, and 5.6 GHz communication systems), infrared, other relatively localized wireless communication protocol, or any combination thereof. In some embodiments, the communications network 110 may support protocols used by wireless and cellular phones and personal email devices (e.g., a BLACKBERRY®). Such protocols may include, for example, GSM, GSM plus EDGE, CDMA, quadband, and other cellular protocols. In another example, a long range communications protocol can include Wi-Fi and protocols for placing or receiving calls using VOIP, LAN, WAN, or other TCP-IP based communication protocols. The transmitting device 12 and receiving device 11, when located within communications network 110, may communicate over a bidirectional communication path such as path 13, or over two unidirectional communication paths. Both the transmitting device 12 and receiving device 11 may be capable of initiating a communications operation and receiving an initiated communications operation.

The transmitting device 12 and receiving device 11 may include any suitable device for sending and receiving communications operations. For example, the transmitting device 12 and receiving device 11 may include a mobile telephone devices, television systems, cameras, camcorders, a device with audio video capabilities, tablets, wearable devices (e.g., wearable wrist or watch type devices, pendants, head-worn devices, pins, etc.), and any other device capable of communicating wirelessly (with or without the aid of a wireless-enabling accessory system) or via wired pathways (e.g., using traditional telephone wires). The communications operations may include any suitable form of communications, including for example, voice communications (e.g., telephone calls), data communications (e.g., e-mails, text messages, media messages), video communication, or combinations of these (e.g., video conferences).

Figure 2:
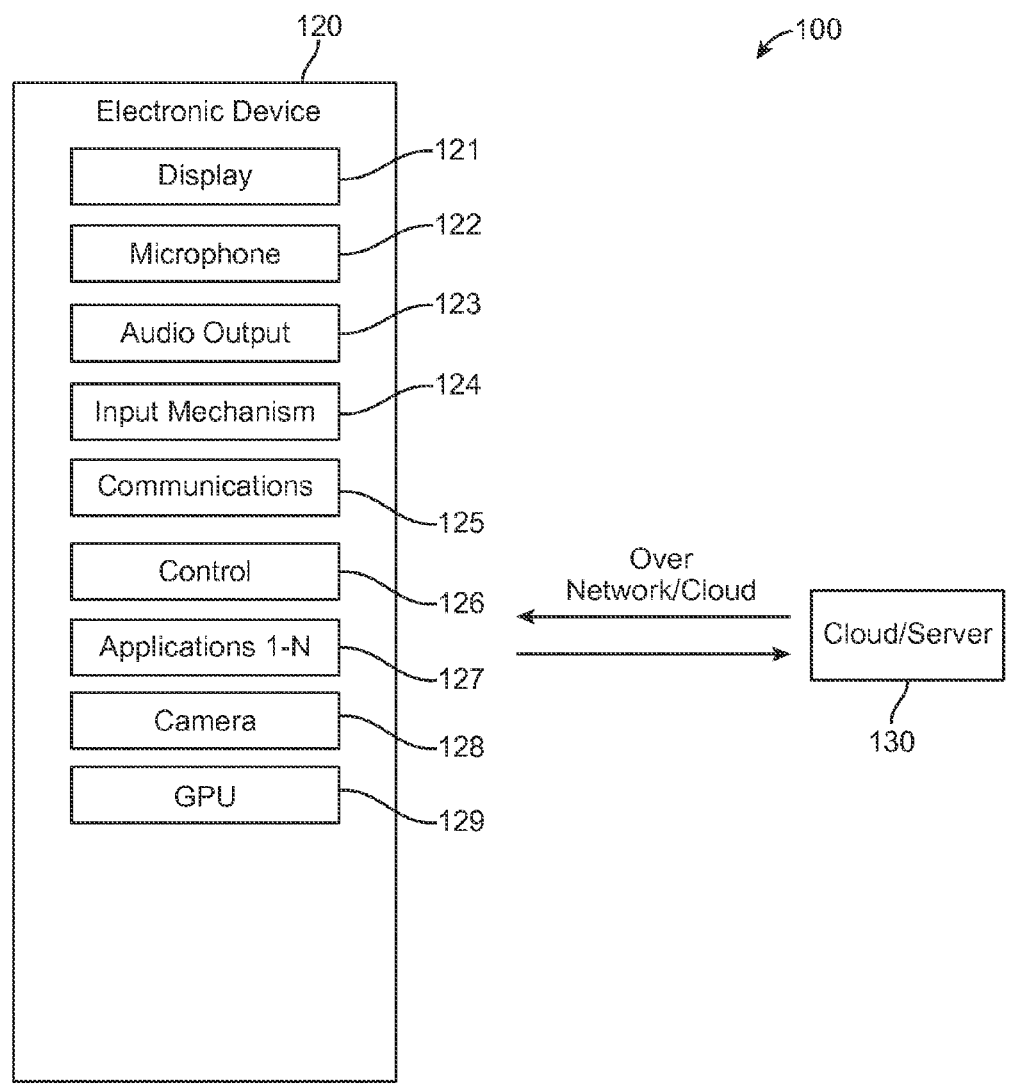
FIG. 2 shows a block diagram of an architecture for a system including a mobile device including a graphical processing unit (GPU), according to an embodiment.

FIG. 2 shows a functional block diagram of an architecture system 100 that may be used for graphics processing in an electronic device 120. Both the transmitting device 12 and receiving device 11 may include some or all of the features of the electronics device 120. In one embodiment, the electronic device 120 may comprise a display 121, a microphone 122, an audio output 123, an input mechanism 124, communications circuitry 125, control circuitry 126, a camera interface 128, a GPU 129, and any other suitable components. In one embodiment, applications 1-N 127 are provided and may be obtained from a cloud or server 130, a communications network 110, etc., where N is a positive integer equal to or greater than 1.

In one embodiment, all of the applications employed by the audio output 123, the display 121, input mechanism 124, communications circuitry 125, and the microphone 122 may be interconnected and managed by control circuitry 126. In one example, a handheld music player capable of transmitting music to other tuning devices may be incorporated into the electronics device 120.

In one embodiment, the audio output 123 may include any suitable audio component for providing audio to the user of electronics device 120. For example, audio output 123 may include one or more speakers (e.g., mono or stereo speakers) built into the electronics device 120. In some embodiments, the audio output 123 may include an audio component that is remotely coupled to the electronics device 120. For example, the audio output 123 may include a headset, headphones, or earbuds that may be coupled to communications device with a wire (e.g., coupled to electronics device 120 with a jack) or wirelessly (e.g., BLUETOOTH® headphones or a BLUETOOTH® headset).

In one embodiment, the display 121 may include any suitable screen or projection system for providing a display visible to the user. For example, display 121 may include a screen (e.g., an LCD screen) that is incorporated in the electronics device 120. As another example, display 121 may include a movable display or a projecting system for providing a display of content on a surface remote from electronics device 120 (e.g., a video projector). Display 121 may be operative to display content (e.g., information regarding communications operations or information regarding available media selections) under the direction of control circuitry 126.

In one embodiment, input mechanism 124 may be any suitable mechanism or user interface for providing user inputs or instructions to electronics device 120. Input mechanism 124 may take a variety of forms, such as a button, keypad, dial, a click wheel, or a touch screen. The input mechanism 124 may include a multi-touch screen.

In one embodiment, communications circuitry 125 may be any suitable communications circuitry operative to connect to a communications network (e.g., communications network 110, FIG. 1) and to transmit communications operations and media from the electronics device 120 to other devices within the communications network. Communications circuitry 125 may be operative to interface with the communications network using any suitable communications protocol such as, for example, Wi-Fi (e.g., an IEEE 802.11 protocol), BLUETOOTH®, high frequency systems (e.g., 900 MHz, 2.4 GHz, and 5.6 GHz communication systems), infrared, GSM, GSM plus EDGE, CDMA, quad-band, and other cellular protocols, VOIP, TCP-IP, or any other suitable protocol.

In some embodiments, communications circuitry 125 may be operative to create a communications network using any suitable communications protocol. For example, communications circuitry 125 may create a short-range communications network using a short-range communications protocol to connect to other communications devices. For example, communications circuitry 125 may be operative to create a local communications network using the BLUETOOTH® protocol to couple the electronics device 120 with a BLUETOOTH® headset.

In one embodiment, control circuitry 126 may be operative to control the operations and performance of the electronics device 120. Control circuitry 126 may include, for example, a processor, a bus (e.g., for sending instructions to the other components of the electronics device 120), memory, storage, or any other suitable component for controlling the operations of the electronics device 120. In some embodiments, a processor may drive the display and process inputs received from the user interface. The memory and storage may include, for example, cache, Flash memory, ROM, and/or RAM/DRAM. In some embodiments, memory may be specifically dedicated to storing firmware (e.g., for device applications such as an operating system, user interface functions, and processor functions). In some embodiments, memory may be operative to store information related to other devices with which the electronics device 120 performs communications operations (e.g., saving contact information related to communications operations or storing information related to different media types and media items selected by the user).

In one embodiment, the control circuitry 126 may be operative to perform the operations of one or more applications implemented on the electronics device 120. Any suitable number or type of applications may be implemented. Although the following discussion will enumerate different applications, it will be understood that some or all of the applications may be combined into one or more applications. For example, the electronics device 120 may include an automatic speech recognition (ASR) application, a dialog application, a map application, a media application (e.g., QuickTime, MobileMusic.app, or MobileVideo.app), social networking applications (e.g., FACEBOOK®, TWITTER®, etc.), an Internet browsing application, etc. In some embodiments, the electronics device 120 may include one or multiple applications operative to perform communications operations. For example, the electronics device 120 may include a messaging application, a mail application, a voice-mail application, an instant messaging application (e.g., for chatting), a videoconferencing application, a fax application, or any other suitable application for performing any suitable communications operation.

In some embodiments, the electronics device 120 may include a microphone 122. For example, electronics device 120 may include a microphone 122 to allow the user to transmit audio (e.g., voice audio) for speech control and navigation of applications 1-N 127, during a communications operation or as a means of establishing a communications operation or as an alternative to using a physical user interface. The microphone 122 may be incorporated in the electronics device 120, or may be remotely coupled to the electronics device 120. For example, the microphone 122 may be incorporated in wired headphones, the microphone 122 may be incorporated in a wireless headset, the microphone 122 may be incorporated in a remote control device, etc.

In one embodiment, the camera interface 128 comprises one or more camera devices that include functionality for capturing still and video images, editing functionality, communication interoperability for sending, sharing, etc. photos/videos, etc.

In one embodiment, the GPU 129 comprises processes and/or programs for processing images and portions of images for rendering on the display 121 (e.g., 2D or 3D images, High definition (HD), ultra-HD (UHD), etc.). In one or more embodiments, the GPU 129 may comprise GPU hardware and memory (e.g., a unified heap architecture (UHA) 410 (FIG. 4), static random access memory (SRAM), dynamic RAM (DRAM), core processor(s), cache, etc.).

In one embodiment, the electronics device 120 may include any other component suitable for performing a communications operation. For example, the electronics device 120 may include a power supply, ports, or interfaces for coupling to a host device, a secondary input mechanism (e.g., an ON/OFF switch), or any other suitable component.

Figure 3:
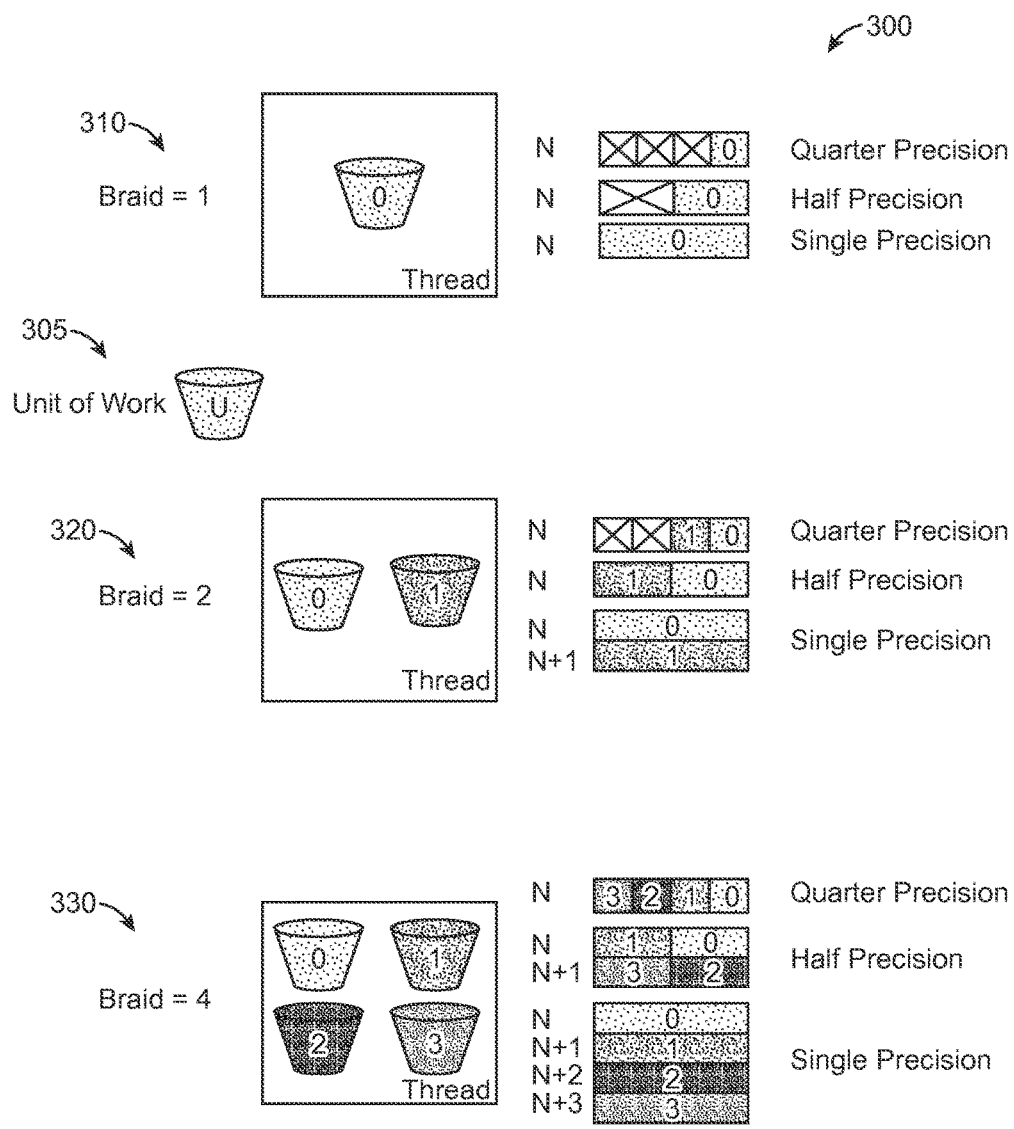
FIG. 3 illustrates packing including one or more units of work.

FIG. 3 shows a diagram 300 of example WARP structures including one or more units of work. In one example, a unit of work is a set of input data that will pass through a shader <program> to produce an output data set. In one embodiment, the compiler bundles 1, 2, or 4 units of work into a single thread (also may be referred to as an execution thread) in order to efficiently process data of different sizes. This bundle is known as a pack. The number of elements in a pack determines how less than full width computation are performed, as shown in the diagram 300. In one example, braid=1 310 shows a thread with a unit of work 305 0, braid=2 320 shows a thread with units of work 305 0 and 1, and braid=4 330 shows a thread with units of work 305 0, 1, 2 and 3.

In one example, a number of work units 305 are bound into a thread and then a number of threads are bound together to execute a shader <program> into a structure referred to as a WARP. A WARP binds a multiplicity of work units 305 into a single point of control. In one example embodiment, the WARP may contain up to 32 threads, and a compiler of a GPU (e.g., part of the GPU 129, FIG. 2) may pack up to 4 units of work 305 (e.g., braid=4 330) into a single thread. In one example embodiment, the packing factor determines the placement of input data into the threads of a WARP. A processing element 400 (FIG. 4) may process up to 8 WARPs. In one example, each WARP is associated with 64-registers in the scalar register file. In one example, each scalar register is 32-bits in size. A 3-bit WARP Identifier is concatenated with the scalar register specifier in an instruction in order to fully address a scalar register file. In one example embodiment, all threads in the WARP share the same scalar register file.

In one example, a thread is a point of control within a WARP. Each thread is associated with a <thread> register file. In one example, a thread may be allocated as few as 8 and as many as 256 registers with 8 register granularity. The WARP carries a register base address which relocates instruction register specifiers into register file addresses. The register file 420 (FIG. 4) contains 32 KBytes of storage, which may be allocated to various WARPs. In one example, when the shader program uses 32 or fewer registers per thread, all 8 WARPs may be active simultaneously. WARPs from different shaders may have different sized register files. The size of a given register file 420 is found in the shader header 610 (FIG. 5).

In one example, a 2-bit WARP braiding field identifies the mode of operation of the threads within the WARP. The braiding enables the compiler of the GPU to produce optimal codes when shader programs utilize half precision and quarter precision instructions. The instructions compute 2 or 4 units of work 305 in a single instruction per thread when braided. In one example, the units of work 305 are governed by an execution mask, one bit of each mask governs a unique unit of work over the WARP. In one example, each instruction in a shader <program> identifies the associated unit of work 305 so that it may be properly governed. The execution mask may be manipulated to effect predication and control transfer. In one example, a simple code sequence performs most of the manipulation with compare instructions with label instructions.

A WARP executes instructions on behalf of all bound threads in such a way that each instruction sees the results of the previous instruction and may use such as operands immediately via forwarding or with some delay by utilizing a tunnel file. In one example, a trace 650 (FIG. 6) is a shader program fragment and consists of a trace header 670 and a number of instructions 660-661. In one example, the trace header 670 may contain a set of resources that must be available prior to running the instructions 660-661 with the trace 650 and a set of bit vectors of outstanding <previous> request that must have been performed prior to scheduling this WARP back into execution. The WARP scheduler uses this information in deciding which WARP to schedule <next>.

In one example, a trace 650 (FIG. 6) has a limited maximum size (in the range of 64 to 128 instructions), and the compiler of the GPU will break a trace when the instruction sequence is too long, or when an instruction needs an outstanding request as an operand (such as a Load result or a texture result). In one example, a WARP may be in one of four (4) states: Idle, Initializing, Executing, or Waiting. Once configured and initialized, the WARP may be scheduled into operation when the resources required are available. In one example, once scheduled the WARP will execute all of the instructions in a trace 650. This gives the WARP scheduler time to find a subsequent WARP that may enter execution (again).

Figure 4:
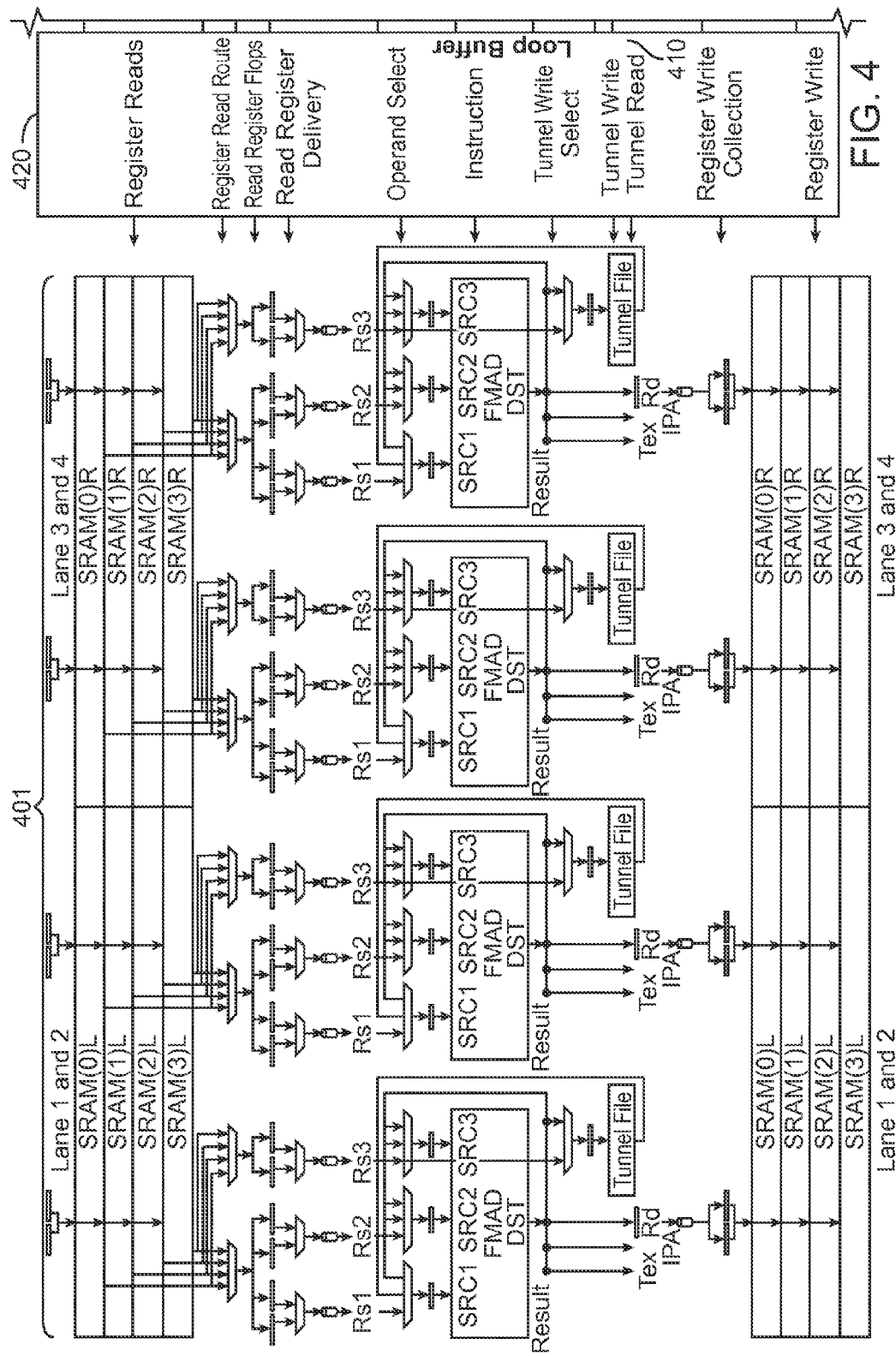
FIG. 4 shows an example processing element architecture that may be implemented with an embodiment.
Figure 4:
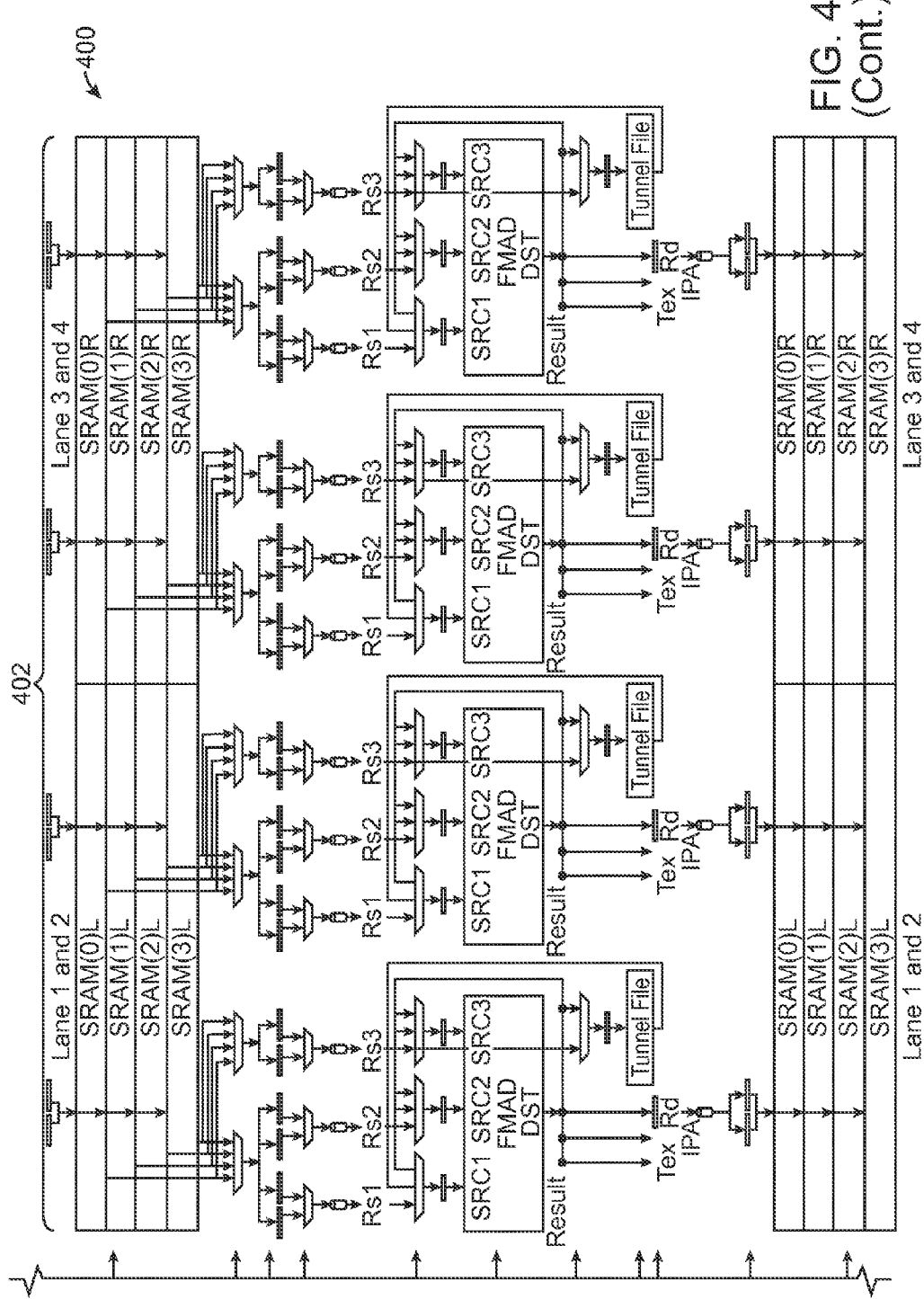
Figure 5:
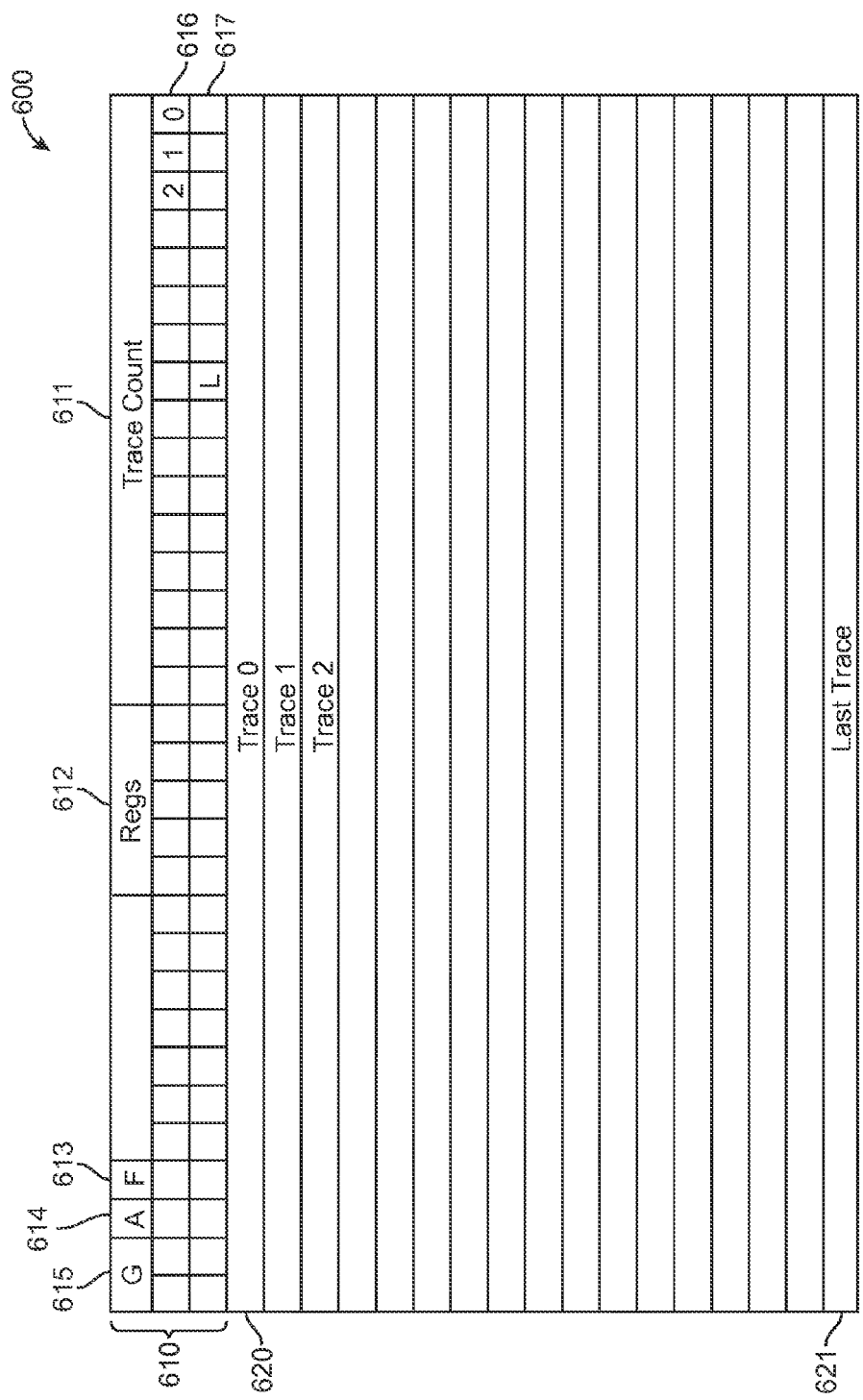
FIG. 5 shows an example shader format structure that may be implemented with an embodiment.

In one example, an Idle WARP may be assigned work units 305, assigned a shader program, and allocated a register file 420 (FIG. 4). A shader constructor initializes a WARP by moving units of work 305 to the register file 420, fixed function requests may be pre-processed, and then the WARP may be scheduled into execution. After Initialization WARPs toggle between the Waiting and Executing states until the end of the shader <program> at which time they return to the Idle state.

Figure 6:
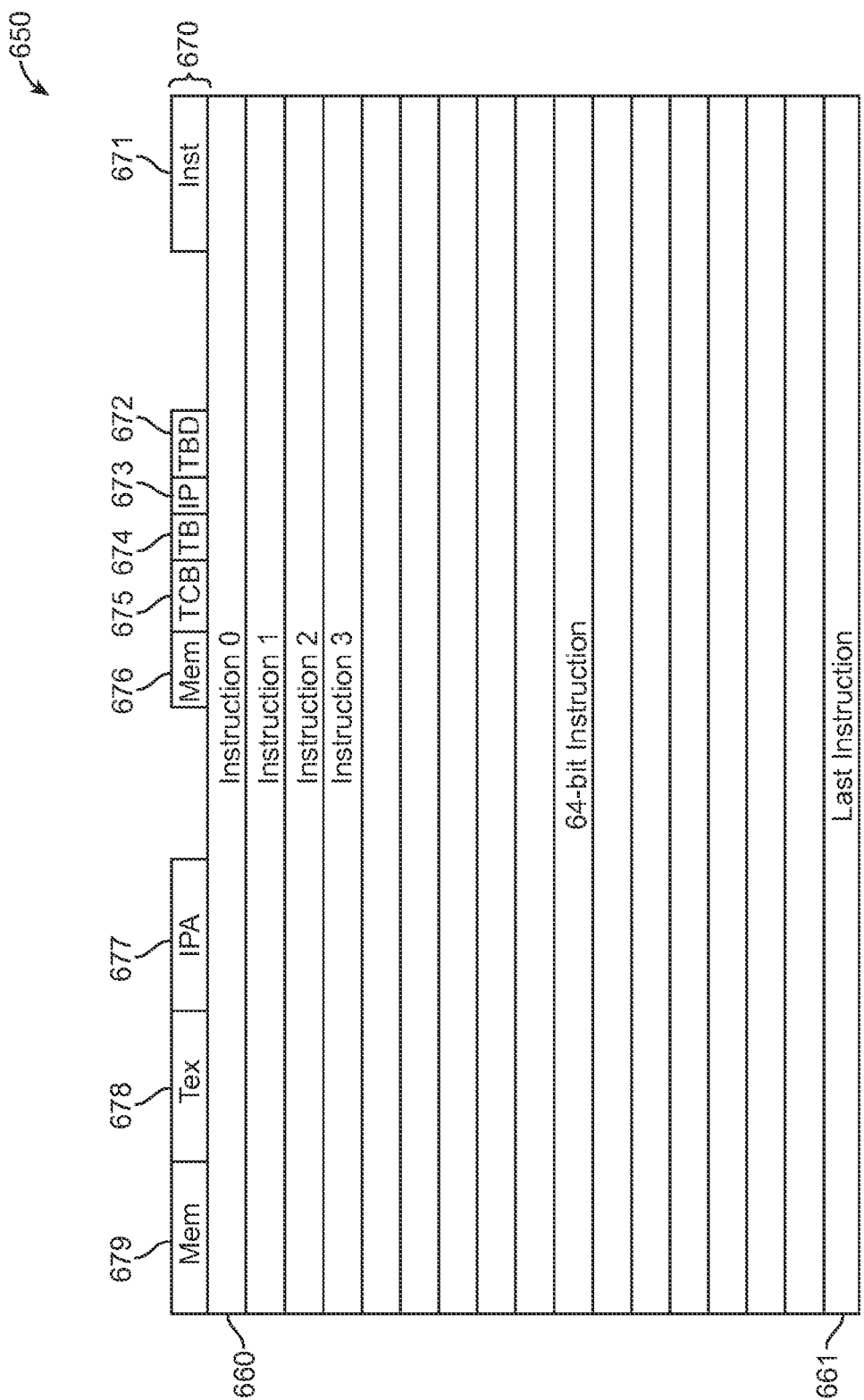
FIG. 6 shows an example trace format structure that may be implemented with an embodiment.

In one example, a WARP waits at a trace header 670 (FIG. 6). The trace header 670 contains the list of events that must take place before scheduling the WARP (back) into execution and resources required to run the trace to completion. Once the resources are available and the events have occurred, the WARP becomes a candidate. In one example, the WARP scheduler picks from among the contending WARP candidates for the next WARP to enter execution.

In one example, after the WARP is scheduled, the WARP scheduler preloads the Loop Buffer 410 (FIG. 4) by shipping the instructions 660-661 (FIG. 6) in a trace 650 from the instruction cache to the instruction decoder in the Loop Buffer 410. The instruction decoder decodes the instruction and places the decoded information into the Loop Buffer 410. In one example, once the trace 650 is installed in the Loop Buffer 410, the WARPs may be scheduled.

The WARP scheduler keeps track of which traces 650 are loaded into the Loop Buffer 410 and skips the installation if the trace 650 is already present. In one example, the WARP scheduler prioritizes WARPs pending on the same trace 650 over WARPs pending on a trace 650 yet to be loaded. A WARP may be configured to perform several units of work 305. In one example, the WARP may begin interpolation and texture accesses prior to the start of the pixel shader program. The register file allocation may be deferred until these computations are ready to deliver values to the register file 420 (FIG. 4). The register file 420 is then allocated and parts of it are prefilled with input data. In one example, any required scalar data is also written into the scalar register file.

FIG. 4 shows an example processing element 400 architecture that may be implemented by one or more embodiments. The processing element 400 comprises of 8 lanes 401-402 of computation, a register file 420, and a Loop Buffer 410. The Loop Buffer 410 contains a small instruction cache, the instruction decoder and the instruction sequencer. A register comprises a software value that may be delivered into computation and received from computation, and the register file 420 is an organization of SRAM instances that holds registers.

The fused multiply and add (FMAD) units perform single precision floating point arithmetic instructions and are instrumental in μCode implementing the transcendental instructions. The Integer unit performs most integer arithmetic, logic operations, and memory address calculations. The BIT manipulation unit performs bit manipulation operations. In one example, pipeline time flows strictly downward except for the two forwarding paths back to the computation unit input multiplexers. The structures at the top of the processing element 400 are the same PDP SRAM components as the structures at the bottom of the processing element 400. In one example, the upper PDP SRAM components are used to read operands and deliver them into computation, while the lower PDP SRAM components are used to write computed values back into the register file 420.

In one example, for the processing element 400 only four operand flip-flops may satisfy the needs of the collectors. In one example embodiment, both normal sequencing {Single Precision, Half Precision and Quarter Precision} and special functional units (SFU) sequencing {Double Precision and certain Integer instructions} may be satisfied by accessing the SRAMs slightly differently. In one example, the registers are used in even-odd pairs for the first two accesses and in even-even and odd-odd pairs on the second set of accesses, which complicates the control but saves the number of required multiplexors.

FIG. 5 shows an example shader 600 format structure, that may be implemented by one or more embodiments. In one example, a shader 600 is composed of a shader header 610, a shader Active Search Table 616, an array of trace pointers 617 (one for each trace 620-621) in the shader 600), and a number of traces 620-621. In one example, a shader 600 begins on a cache line boundary (32 or 64 bytes), and each element in the shader 600 is one word in length (4 bytes).

In one example, the shader header 610 contains a trace count 611 of the number of traces 620-621, the register count 612 of the number of registers per thread, braid control information 615, and a Fixed Function bit 613. Immediately following the shader header 610 is the Active Search Table 616 that includes a number of traces divided by 32 of an Activating Search Optimizer.

In one example, the braid specifier of the braid control information 615 is used by the fixed function units in depositing a number of work units 305 (FIG. 3) into a single thread. In one example, the A bit 614 specifies if the Active Search Table is list present. The Active Search Table is a bit vector with one bit for each trace 620-621. In one example, this list is used to rapidly search forward for the first activating instruction when the execution mask has become zero. The search is performed with a Find First Set circuit that may process 32 (or even 64) traces 620-621 per cycle in the search. Once the trace number is found the trace pointer list is indexed, and the WARP is scheduled to run that trace on its next opportunity.

The Active Search Optimizer tables may only be used in shaders with Forward Branching, CALLs and RETurns, and indirect Jumping. In one example, shaders 600 without these features may omit the tables by clearing the A bit 614 in the shader header 610. In one example, most shaders 610 are small enough such that these tables represent essentially no overhead. In one example, when the Fixed Function Specifier bit 613 (F) is set, the first trace 620-621 in a shader 600 (i.e., trace number 0 or Trace 0) contains instructions for fixed function units. These instructions run autonomously and potentially concurrently with WARP execution. In one example, if the F bit 613 is not set, then trace 0 is the first trace 620-621 to be executed by the shader program.

In one example, there are a number of Trace Pointers in the trace pointer array 617 once a particular trace 620-621 is identified by number. The trace pointer is used to access instructions over a 36-bit address space. The value in the pointer is shifted up by 4 bits (4 bits corresponds to 32-Byte cache lines and a 36-bit address space, 5 corresponds to 64-Byte cache lines and a 37-bit address space) to become the byte address of the instruction. In one example, shader threads receive an input data set, and compute an output data set.

In one example, another field in the shader header 610 includes data used to configure the Graphics Pipeline (e.g., graphics pipeline 1700, FIG. 17) to fill the registers correctly based on both group and size of input data item. In one example, an additional field in the shader header 610 includes data to configure the receiving Graphics Pipeline 1700 for the data being emitted. In one example, the additional fields may also be stored in a Graphics Pipeline Configuration data structure, which contain pointers to the shaders pertinent to this pipeline configuration.

In one example, when a Graphics Pipeline 1700 (FIG. 17) is configured, the driver initializes constant scratch from uniforms accessed by the shader programs which will run in this configuration. Constant scratch is shared across 4 processing elements 400 (FIG. 4) in a Shader core of a GPU. In one example, the pre-configuration eliminates the load instruction and its associated latency from the shader program. In one example, the input data set is placed into the register file 420 (FIG. 4) by shader constructors prior to the WARP starting to run the shader 600. The output data is emitted (typically) near the end of the shader 600 to other fixed function units.

FIG. 6 shows an example trace 650 format structure that may be implemented by one or more embodiments. In one example, a trace 650 is a series of instructions 660-661 that will be performed entirely from one scheduling event of one WARP. In one example, a trace 650 comprises a trace header 670, and a series of processing element 400 (FIG. 4) instructions 660-661. The trace header 670 contains a list of events that must have transpired prior to scheduling and a list of all resources that the instructions will require in order to run to completion. A trace 650 may contain forward and backwards branches, including loops. In one example, no instruction in a trace 650 may be dependent upon a result with unknowable latency.

The trace header 670 and all instructions 660-661 are 64-bits in size and begin on a cache line boundary. In one example, the trace header 670 contains bit vectors used to represent the outstanding events that must occur prior to this WARP being <re>scheduled. The trace header 670 includes fields for 8-outstanding memory references 679, 8-outstanding texture references 678, and 8 outstanding Interpolation references (IPA) 677. In one example, another 8-bit field exists for Texture Buffer Done (TBD) 672. The trace header 670 also contains field descriptors of the amount of buffer space required prior to this WARP being scheduled. In one example, the Mem field 676 describes how many memory references must be available in the Memory Address Buffer prior to scheduling the WARP. The TCB field 675 describes how many Texture Coordinates must be allocated in the Texture Coordinate Buffer prior to schedule. The TB field 674 describes the persistence of the TCB allocation, and the IP field 673 specifies the number of IPA requests (IPA is mainly Push Mode, the alternative is to send (Pull) Page Table Entries to the processing element 400 (FIG. 4) and have it compute its own interpolations).

In one example, the number of instructions 671 in a trace 650 is limited to the size of the loop buffer 410 (FIG. 4), for example between 64 and 128 pre-decoded instructions. In one example, since each instruction 660-661 processes up to 32 computations, 8 computations at a time over 4 beats of the pipeline 1100 (FIG. 11), once scheduled a trace 650 may take several hundred cycles to complete even without any looping behavior. This gives the WARP scheduler time to schedule the successor WARP and also to pre-load the Loop Buffer so that the WARP switch may take place between instructions 660-661 with little or no temporal overhead.

In one example, as a trace 650 executes, a number or outstanding events are recorded. The trace header 670 of the subsequent trace contains a bit-vector of outstanding events that must have become resolved prior to scheduling the WARP on the subsequent trace. In one example, this means WARPs are not scheduled into execution until all required outstanding results have been performed. This also means that the shader compiler may decide that some of the outstanding events are not needed in order to execute the subsequent trace.

In one example, as instructions 660-661 are decoded into the Loop Buffer 410 (FIG. 4), if the instruction activates threads, then the instruction decoded sets a bit in the Activate search table 616 (FIG. 5). In one example, if the execution mask ever becomes empty, this Activate search table 616 is used to rapidly skip instructions that have no chance of turning idle units of work back into an active state. In one example, along with the Activate search table 616 used by the WARP scheduler, once the execution mask becomes clear, then the only instructions that get executed are the ones that may turn inactive units of work 305 (FIG. 3) back into active units of work 305.

In one example, if the F bit 613 (FIG. 5) in the shader header 610 is set, trace 0 contains a list of instructions for fixed function units to perform autonomously or by means of stimulation from the shader 600. The latter is used to manage register file 420 (FIG. 4) pressure by the compiler of the GPU. In one example, this trace 650 generally consists of Interpolation requests and Texture requests; many of which may be processed prior to allocating a register file 420 to the WARP. In one example, only when the texture request is nearing completion does a register file 420 even need to be allocated to the waiting WARP.

Figure 7:
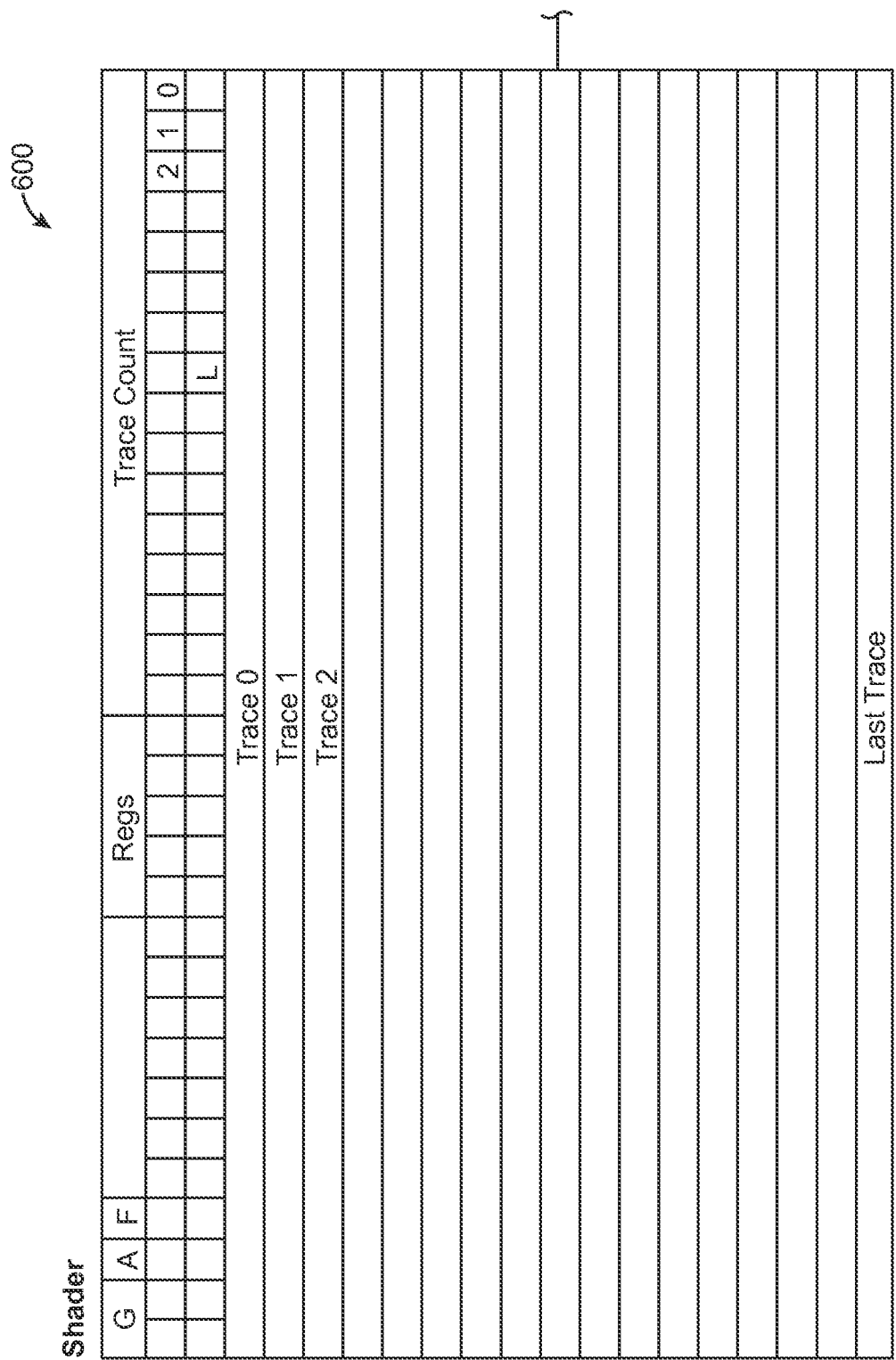
FIG. 7 shows an example of a shader and trace relationship that may be implemented with an embodiment.
Figure 7:
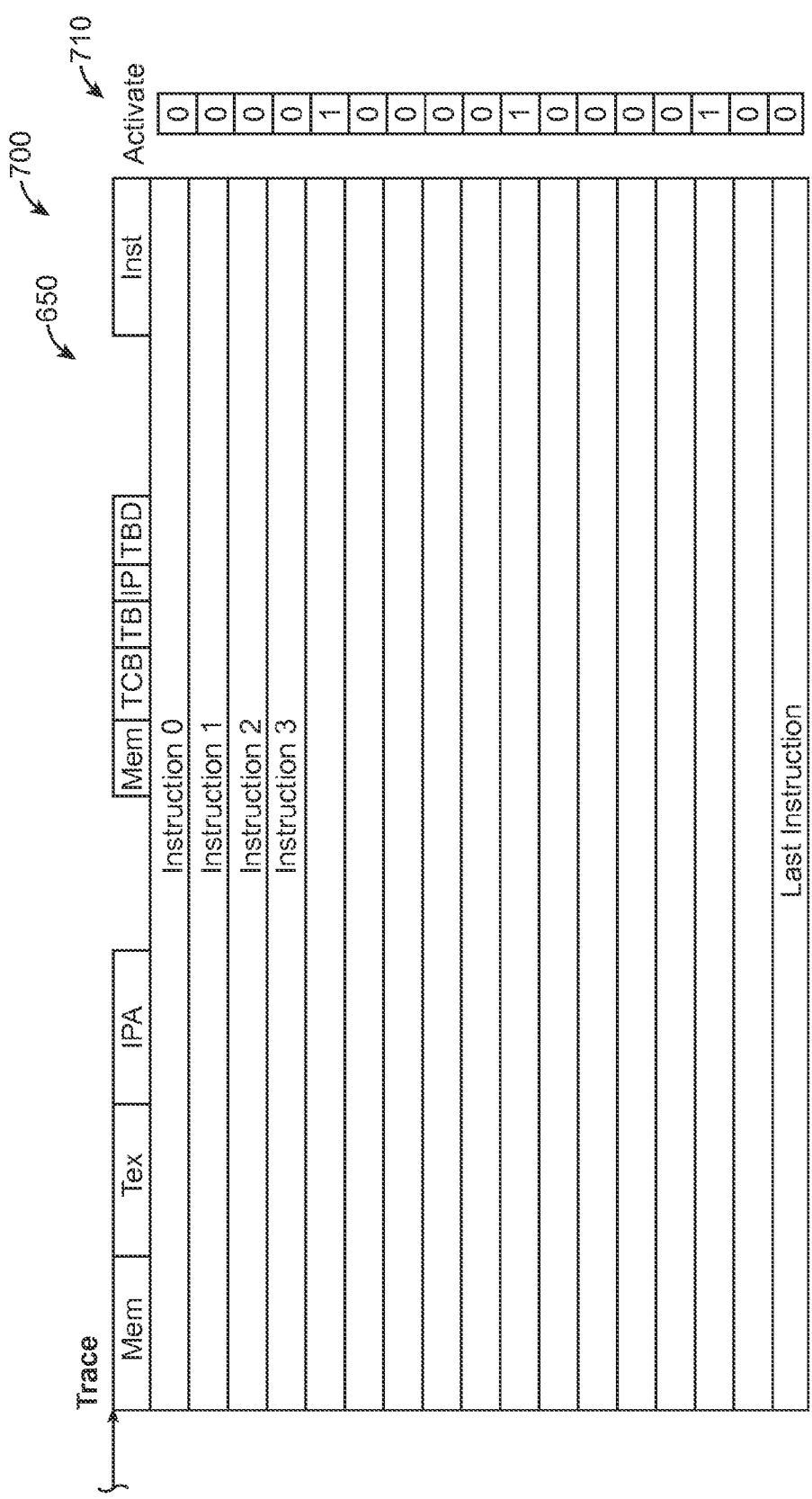

FIG. 7 shows an example 700 of a shader 600 and trace 650 relationship, that may be implemented by one or more embodiments. In one example, both shader 600 and trace 650 are located on cache line boundaries. The addressable instruction space is increased by the same amount using 64 Byte cache lines that enable 32-bit pointers to point into a 38-bit byte-addressable space. The activate 710 indicator fields may indicate threads that are active.

FIG. 8 shows an example of instruction code 800. A conventional approach to address mixed precision would, for example, rely on compiler analysis to examine the code and find independent computation(s) that can be fused into and processed in vector form. This approach usually suffers from the lack of opportunities in the code itself, producing poor results.

FIG. 9 shows an example of the original instruction code of FIG. 8 transformed into braided code 900, according to an embodiment. In one example, the braided code includes replicated code 910 and vectorized code 920. In one embodiment, the braiding approach exploits the large amount of parallelism inherent to workloads processed by a GPU. Having enough neighboring threads that execute identical instruction streams provides for conveniently merging lower precision work from several threads into one thread. Therefore, one or more embodiments achieve full utilization for those precision types that correspond to braiding factors up to the maximum chosen by the compiler. It should be noted that a braiding factor may be defined as a number of units of work encoded into a physical thread. The value of the braiding factor is determined based on the mix of precision requirements presented in one unit of work. In one or more embodiments, the braiding scheme encodes the work required for several data elements into one physical thread of execution.

In one example, a braiding factor value may be 2 or 4, however, the same braiding technique may be used for other braiding factor values as well. Given code for one unit of work, a compiler of a GPU determines the braiding factor value based on precision requirements and applies code transformations equivalent to the combination of selective code replication, predication, and condition disjunctions. Underlying hardware must be capable of executing instructions with different values of precision qualifiers controlled by a predication mask specifying units of work that are involved in each given computation.

In one embodiment, instructions that require precision other than that corresponding to the maximum braiding factor of a program are replicated for each logical thread. Instructions that allow reduced level of precision execute several units of work in "vector form," that is, with several data units packed into a register and processed simultaneously. In one example, as precision information is known at compile-time via either explicit qualification in the source language or as a result of compiler analysis, in one example it is a straightforward task for a compiler to classify instructions based on that information as soon as it is available. After classification the compiler replicates instructions (e.g., replicated instructions 910) with precision higher than the precision corresponding to the selected braiding factor. The compiler also vectorizes instructions (e.g., vectorised instructions 920) with precision that is smaller than the basis precision of the architecture (e.g., floating point (fp) 32). In one example, it may be necessary to account for any discrepancy between precision types in instruction inputs by packing or widening operands. Enterprise Software Solutions Lab (eSSL) support multiple precision qualifiers as indicated in Table I. Based on the multiple precision qualifiers, conventional systems lose throughput by working on a single item per instruction/register. Additionally, fragmentation occurs in the register file when using distinct registers for individual inputs/uniforms.

TABLE I

| Qualifier Floating | Floating Point Range | Floating Point Magnitude Range | Floating Point Precision | Integer RangeSigned | Integer Range Unsigned |
|---|---|---|---|---|---|
| High Precision | As IEEE-754 $(-2^{126}, 2^{127})$ | As IEEE-754 0.0, $(-2^{126}, 2^{127})$ | As IEEE 754 relative: $2^{-24}$ | $[-2^{31}, 2^{31} - 1]$ | $[0, 2^{32} - 1]$ |
| Medium Precision (min Requirements) | $(-2^{14}, 2^{14})$ | $(-2^{14}, 2^{14})$ | Relative: $2^{-10}$ | $[-2^{15}, 2^{15} - 1]$ | $[0, 2^{16} - 1]$ |
| Low Precision (min. Requirements) | $(-2, 2)$ | $(-2^{-8}, 2)$ | Absolute: $2^{-8}/2^{-9}$ signed/unsigned | $[-2^8, 2^8 - 1]$ | $[0, 2^9 - 1]$ |

Figure 10:
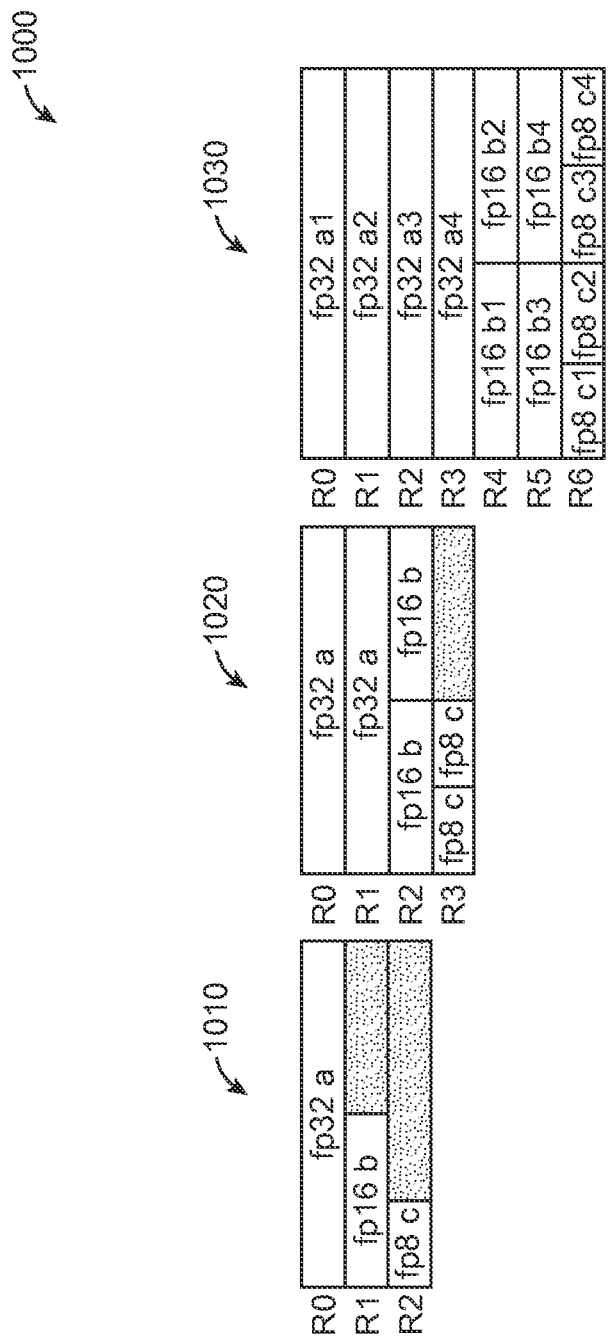
FIG. 10 shows examples of register file layouts, according to an embodiment.

FIG. 10 shows an example 1000 of multiple register file layouts, according to an embodiment. In one embodiment, the example 1000 shows an example register file layout for one (1) unit of work 1010, two (2) units of work 1020, and four (4) units of work 1030. In one example, the braiding technique achieves register file defragmentation via efficient packing of program inputs. For example, for a braiding factor of four (4) and a single register in the register file capable of holding a 32-bit value, it is possible to map fp8, fp16 and fp32 to the register file in ways outlined below. Consider a program that has three (3) input values in the form:
 fp32 a;
 fp16 b;
 fp8 c.
Provided all these values are actually used in a program, the example 1000 shows the possible register file layouts for 1, 2 and 4 units of work processed by a single thread. Each scheme requires 12, 8 or 7 registers per 4 threads, with the braiding factor of 4 corresponding to the totally defragmented case.

FIG. 11 shows an example 1100 of a 128-bit mask table per warp, according to an embodiment. In one example, a row is a 32-bit mask (e.g., mask 1130) register (1-bit predicate per data group). A column 1120 covers the mask registers A, B, C and D. Each thread has access to the four (4) mask registers (A, B, C, and D) to account for up to four (4) data-items (vertices, pixels, etc.). The thread identification (ID) is also listed as 1110.

Figure 12:
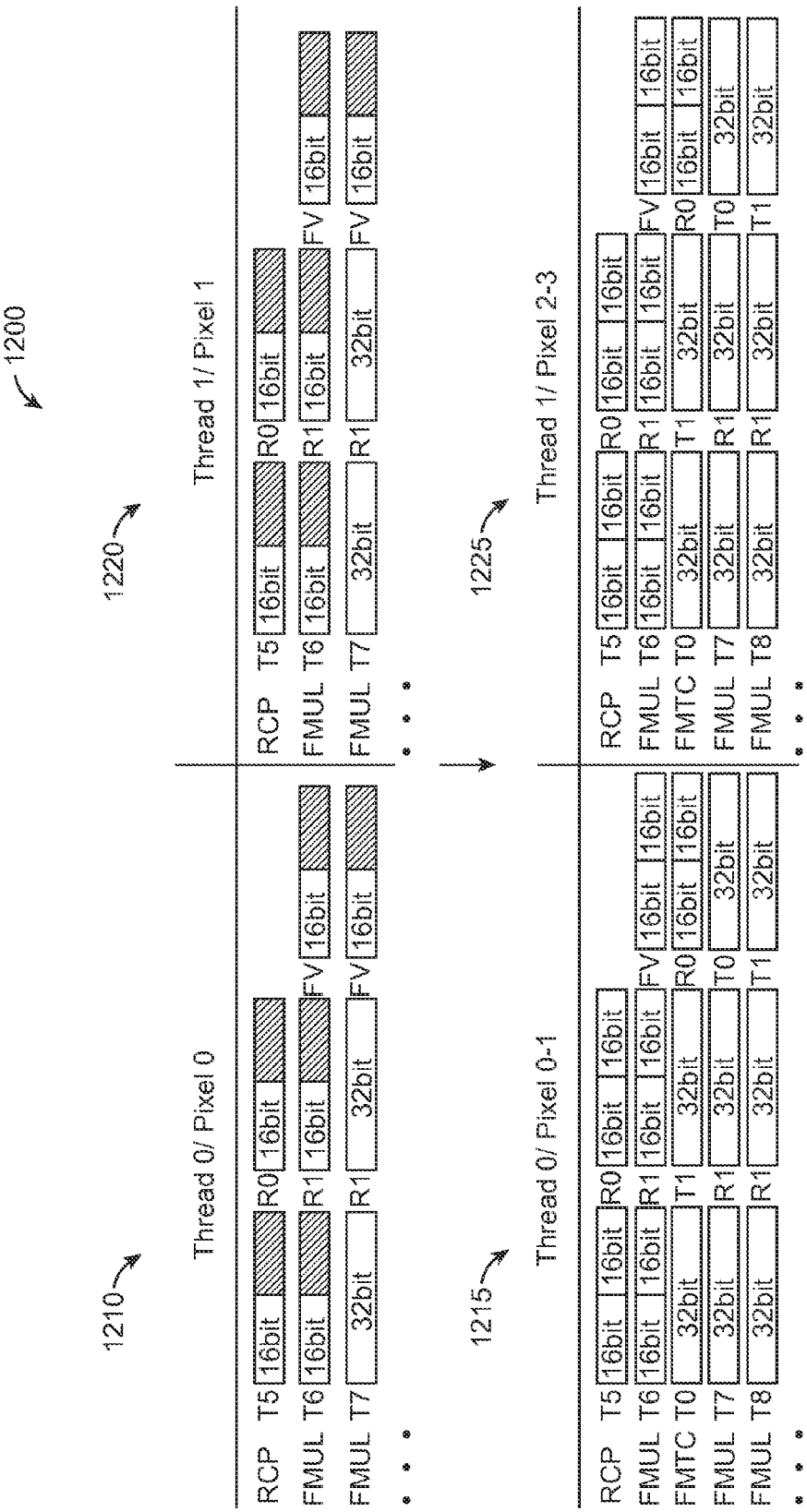
FIG. 12 shows examples of encoded threads, according to an embodiment.

FIG. 12 shows an example 1200 of encoded threads, according to an embodiment. In one example, the encoded threads shown include: thread 0/pixel 0 1210, thread 1/pixel 1 1220, thread 0/pixel 0-1 1215, and thread 1/pixel 2-3 1225. Without braiding applied, two threads 1210 and 1220 (thread 0 and thread 1) carry out two units of work (pixel 0 by thread 0, and pixel 1 by thread 1). Once braiding transformation has been applied, two threads 1215 and 1225 (thread 0 and thread 1) carry out four units of work (pixel 0-1 by thread 0, and pixel 2-3 by thread 2), achieving higher efficiency and better register file utilization despite the increased instruction count.

FIG. 13 shows an example 1300 of transformed code, according to an embodiment. In one example, the transformed code 1300 includes a push computation of several data-items into a single thread: 1× (original or high precision (highp)), 2× (medium precision (mediump)), and 4× (low precision (lowp)). In one example, the original instruction stream is braided to exploit vectorised processing due to precision requirements of the ISA of the processing environment (e.g., a SIMT/D processing environment). In one example, mediump and lowp computations are vectorised, and highp (+mediump in 4×) computations are replicated. In one example, format converters are added for mixed precision, and instructions with predication masks are augmented.

In one example, consider executing a floating point add operation with a braiding factor of two (2) and precision fp16. This example would require each 32-bit-wide input register to hold data for two different data elements in compressed form (16 bits for one data element and 16 bits for the other one). Such an instruction will produce one 32-bit-wide output register that will hold two results of addition in the same compressed form.

In one embodiment, the underlying hardware implements a set of the following features. The ISA must include "shortened" versions of instructions presented in vector form. In one example, an add instruction is used for illustration as follows: FADD.16.A R0, R1, R2. The add instruction executes a 16-bit floating point add on behalf of one unit of work "A" taking 16-bit inputs deposited in 32-bit wide registers R1, R2, and producing a 16-bit output deposited in a 32-bit wide register R0.

In another example, the instruction FADD.16.AB R0, R1, R2 executes two 16-bit floating point adds: one on behalf of unit of work A and another one on behalf of unit of work B, where 32-bit input registers R0, R1 have two 16-bit input values each and produce two 16-bit outputs deposited in a 32-bit wide register R0.

In yet another example, IADD.8.ABCD R0, R1, R2 executes four 8-bit integer adds on behalf of four units of work A, B, C, and D, where 32-bit input registers R0, R1 have four 8-bit input values each and produce four 8-bit outputs deposited in a 32-bit wide register R0.

In one embodiment, an efficient PACK instruction is introduced in the following example: PACK.16.AB R0, R1, R2. This instruction takes input values from specified registers and packs them together in the destination register. The destination register in turn is used as an input for some braided instruction later on. The PACK instruction shown above converts 32-bit values in input registers R1 and R2 into 16-bit format, and combines them into a single 32-bit output register R0.

In one embodiment, the processing environment provides the ability to narrow and widen operands. Efficiency of braiding depends on the low overhead incurred by the need to perform conversion between different representations of values in the program. Instead of inserting additional instructions for such conversions, the hardware offers support for such conversions built into most instructions. In one example, for the following, FADD.32.A R0, R1, <R2>, this instruction performs one unit of work using 32-bit input value in R1 and one of the 16-bit input values in R2 by extracting it and converting it to a 32-bit value before performing the actual operation of addition. The modifier "A" on the instruction governs which of the values is to be extracted from R2.

One or more embodiments provide predication mask handling control flow divergency per unit or work. Since computations required for different units of work encoded in the same physical thread may require taking different paths in the program, the hardware provides means for independently tracking the execution of each unit of work, such as determining branch outcomes for each unit of work, tracking whether each unit of work is currently active or should reactivate, and exposing such means to the inspection and modification by the program.

FIG. 14A shows an example 1400 of control-flow for if-then-else code, according to an embodiment. Example 1400 shows an example of the code that performs explicit calculation of the mask that controls the execution of each unit of work. Compare instructions and logical and/or instructions are used to calculate the mask. In one example, such code may be generated when the source program contains an "if-then-else" construct.

FIG. 14B shows another example 1450 of control-flow for if-then-else code, according to an embodiment. Example 1450 shows an example of the code that performs calculation of the mask that controls the execution of each unit of work when the hardware has underlying support for such. Compare instructions and else/endif instructions automatically calculate and update the mask. In one example, such code may be generated when the source program contains an "if-then-else" construct.

FIGS. 15A-B show examples 1500 and 1550 of control-flow for do-while code, according to an embodiment. Example 1500 shows an example of the code that performs explicit calculation of the mask that controls the execution of each unit of work. Compare instructions and logical or instructions are used to calculate the mask. In one example, such code may be generated when the source program contains a "do-while" construct. The example shows code that performs calculation of the mask that controls the execution of each unit of work when the hardware has underlying support for such. Compare instructions automatically calculate and update the mask. In one example, such code may be generated when the source program contains a "do-while" construct.

In one example, the compiler can determine which partial to convert from the EM mask field. The size is the result size of the calculation. The operand size is encoded elsewhere in the instruction, and the operand offset is implied by the EM field.

Figure 16:
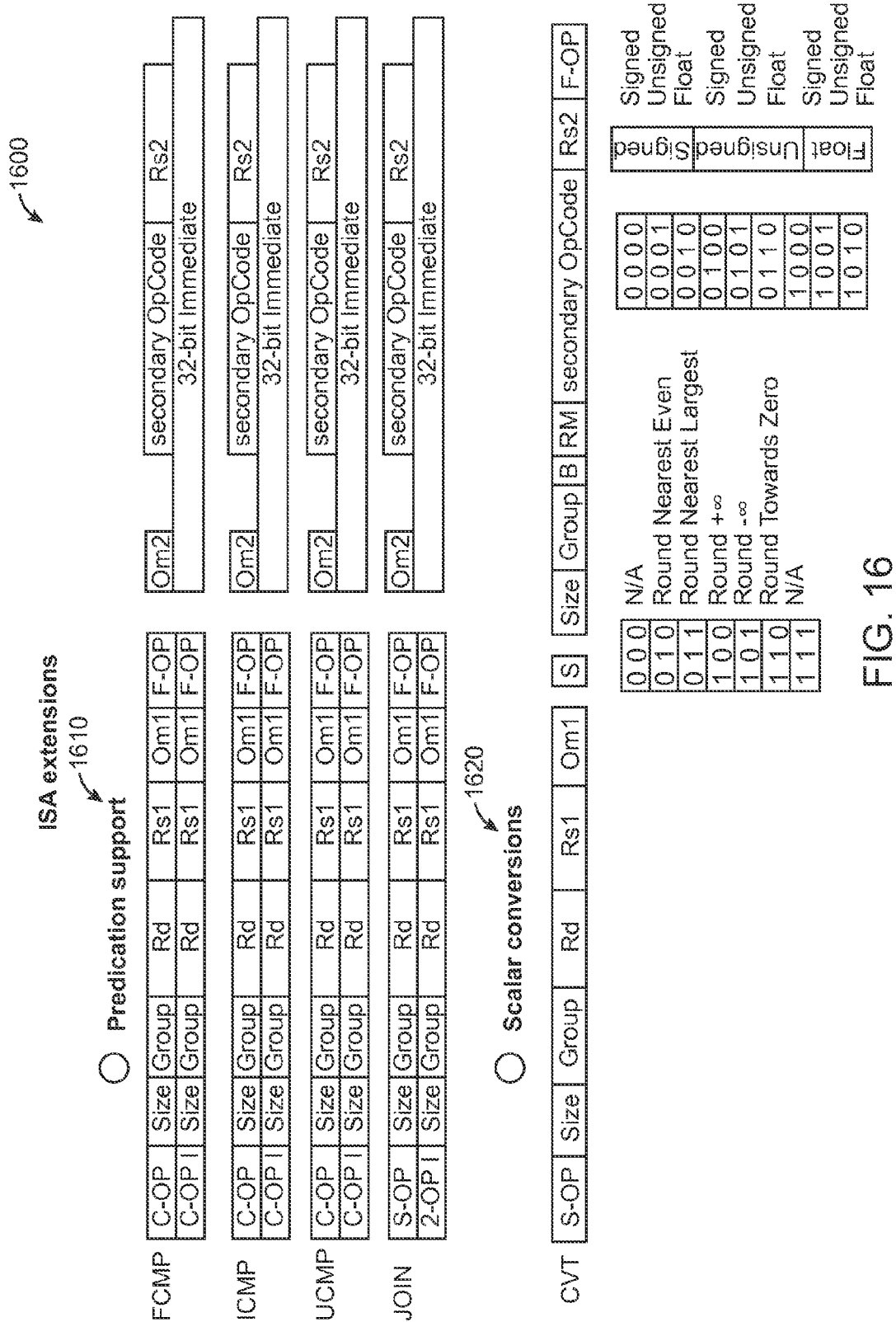
FIG. 16 shows an example of instruction set architecture (ISA) extensions, according to an embodiment.

FIG. 16 shows an example 1600 of ISA extensions, according to an embodiment. In one example, the ISA extension includes predication support 1610 and scalar conversions 1620. In one example, for predication support 1610, the following instructions are provided: FMUL.16.A.B R1, R2, R3, and AND.32.A|B S3, S0, S1. In another example, the following instruction may be provided for predication support 1610: FMUL.16.EM01 R1, R2, R3.

In one embodiment, mask setting instruction may be represented as: EXECMSK_, {S0, S1}. Mask operations may include AND.32.A eMask, eMask, ~S0. In another example, mask setting may include CMP/JOIN instructions, and structure Block change Instructions.

For broadcasting and down-conversion, the instructions may include: FMTC.32.16.A.B {R0, R1}, R4, and FMTC.16.32.A.B O3, {R2, R3}.

In one embodiment, for scalar conversions 1620 may include the following instructions: FMTC.32.16.EM1 R1, R4, FMTC.16.32.EM0 FV, R2, and FMTC.16.32.EM1 R7, R3, FV.

In one example, 1-operand down conversion zeroes OTHER end of result register, and 2-operand down conversion inserts the result into second operand.

In one embodiment, most of the work performed by the compiler is referred to as "braiding" itself. In one example, control-flow support is straightforward. The application driver communicates to the GPU regarding how to pack the register file and uniform space. In one example, a shader header encodes how to pack the register file and uniform space.

One or more embodiments provide the following benefits over conventional systems. Increased throughput for mixed precision, and decreased dynamic instruction count. The register file and constant scratch defragmentation is provided, which potentially increases a number of simultaneous thread launches. Full control and flexibility at compile-time is provided, and if it is determined not to be beneficial, the transformation is not performed.

Figure 17:
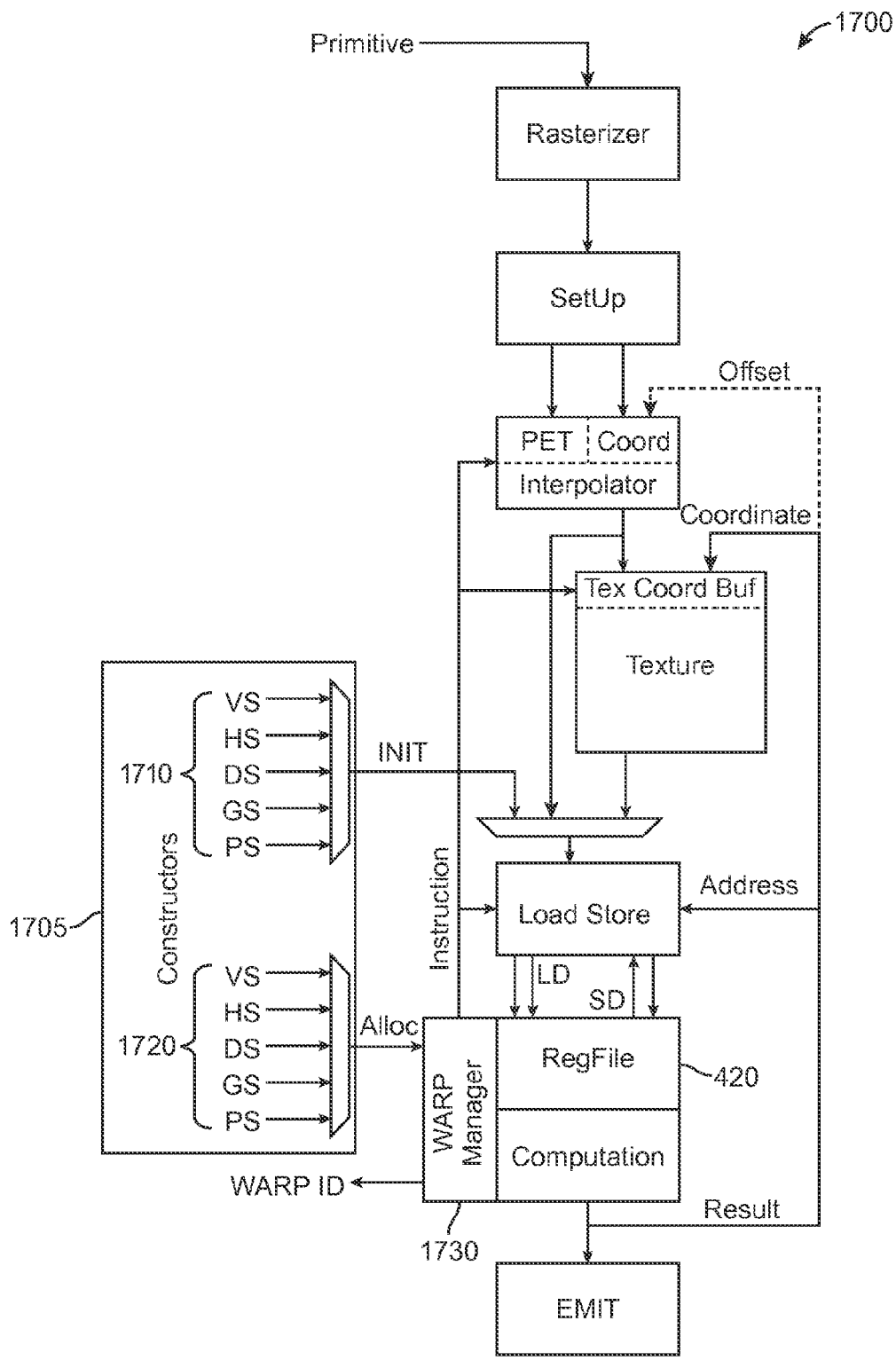
FIG. 17 shows an example block diagram of a processing element and graphics pipeline for a graphics processor that may be implemented with an embodiment.

FIG. 17 shows an example block diagram of a graphics pipeline 1700 for a graphics processor or GPU (e.g., GPU 129, FIG. 2) that may be implemented by one or more embodiments. In one example, a shader core comprises of 4 processing element 400 (FIG. 4) pairs and a number of fixed function units. In one example, some of the fixed function units (e.g., the Load Store) are distributed with the processing element 400 pairs, while others such as Texture and Interpolation are centralized. In one example, many of the fixed function units are illustrated in the example pipeline 1700 along with pertinent conceptual busses. In one example, from the viewpoint of the processing element 400, there are six busses that allow the processing element 400 to interact with the rest of the graphics pipeline 1700.

In one example, the pipeline 1700 includes a 256-bit result plus 32-bits enable bus. The bus serves to deliver results to the next stage of the graphics pipeline 1700 through the EMIT unit, to deliver addresses to the load store unit, to deliver texture coordinates to the Texture Coordinate Buffer, and to deliver offset data to the interpolator for interpolation. In one example, the pipeline 1700 includes a 256-bit Load plus a 32-bit enable bus. The enable bus serves to deliver Load data, Texture results, Interpolation results, and Initialization data into the register file 420. Attached to the enable bus, and running two cycles earlier is a Load address bus which delivers the 9-bit register address to the loop buffer 410 and 32-write enable bits to the register file 420.

In one example, the pipeline 1700 includes a 256-bit Store Data plus a 32-bit enable bus. The enable bus delivers register read data to the Load Store Unit. In one example, attached to the enable bus and running two cycles earlier is the store address bus. The protocol on the enable bus is to send the address on the pipeline beat, two cycles later there will be a signal indicating if data will be arriving in the subsequent cycle and persisting for 4 beats of the pipeline.

In one example, the pipeline 1700 includes a 64-bit instruction bus. The instruction bus delivers instruction bit patterns and relocated register addresses to the Load Store, Texture, and Interpolator. In one example, most uses of the instruction bus only need 12-odd bits to be transferred, but an instruction may need up to 60-bits to be transferred along with the 9 translated register file address bits.

In one example, the Rasterizer is handed a Primitive in the beginning of the pipeline 1700 flow. In one example, draw commands enter the pipeline 1700 from the graphics driver (or optionally from a command processor). Associated with a draw command is a graphics state (GS) (the current state of the OpenGL state machine for a pipeline implementing the OpenGL API). In one example, the Rasterizer determines if the primitive is in the current Tile, and if so, it sets up the Plane Equation Table for Setup, then proceeds to flow out Quads of pixels into the Interpolator coordinate buffer. The Interpolator uses the Plane Equation Tables for each Quad and interpolates the quads into frame coordinate space. The result may be delivered directly to the texture unit Texture Coordinate Buffer or it may be delivered to the register file 420 of a processing element 400 (FIG. 4) through the Load Store Unit. In one example, the Texture Unit uses coordinates stored in the Texture Coordinate Buffer and produces textured Quads under control of instructions.

In one example, the constructors 1705 are in charge of allocating and building WARPs for processing. In one example, this process consists of allocating a WARP, associating a register file 420 with that WARP, filling the register file 420 with initialization data and signaling the WARP manager 1730 to start this WARP into execution. The Load Store Unit performs memory reference instructions, and provides an interface between other fixed function units and the register files 420. In one example, the WARP manager 1730, register file 420 and Computation Unit comprise the processing element 400 (FIG. 4) including the loop buffer 410.

In one example, the EMIT unit routes data emitted from shader programs 1710 and 1720 down the graphics pipeline 1700 to the next stage of processing. Much of the time the emitted data is shipped to shared memory so that a new WARP in a potentially different processing element 400 (FIG. 4) may begin processing the next stage of the graphics pipeline 1700. In one example, the Clip Cull and Viewport (CCV) unit (not shown) of the pipeline 1700 builds an intermediate representation of fully processed primitives that will be processed by the Rasterizer. In one example, the ROP unit (not shown) takes the computed, textured Quads and integrates their data into the frame buffer.

In one example, a graphics processing slice consists of eight processing elements 400 (FIG. 4), a number of fixed function units, and an interface to the GPU network. The GPU delivers a batch of work to the graphics processing slice. The graphics processing slice parses the work into WARP sized bundles, initializes the graphics pipeline 1700 and shader <program>, and assigns threads of work to WARPs which will run on processing elements 400. It should be noted that the example pipeline 1700 is illustrative and provides a guide as how data is routed around the graphics processing slice, and that other configurations and components may be included, components may be substituted, and some components may be eliminated, etc. In one example, there are eight processing elements 400, four Load Store units, one set of five Constructors 1705, one or more Interpolators, and one or more Texture units.

In one example, the register file 420 of a WARP is controlled by the base offset contained within the WARP data structure. In one example, a register in an instruction is mapped into the register file 420 by adding the base shifted up by 2 bits in the WARP to the register in the instruction. In one example, the add computation is performed by a 5-bit adder. In one example, a register address presented to centralized fixed function units contains a Processing Element Number, a register file bit, and a register address. In one example, the low order 2 bits of the register address select the SRAM bank. The Processing element number routes the request to the register file 420 of the appropriate processing element 400 while the register file bit selects between a <thread> register file access or a Scalar register file access.

Figure 18:
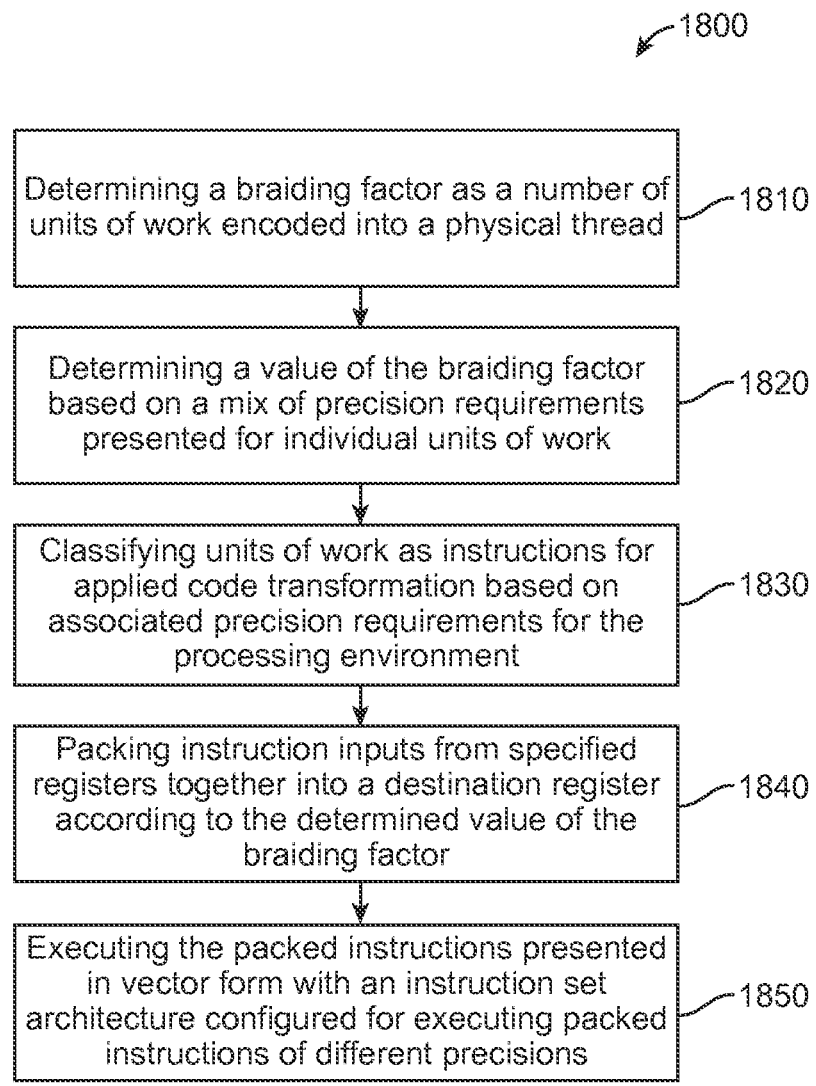
FIG. 18 shows a block diagram of a process for improving power, performance, area (PPA) for mixed precision computations in a processing environment, according to an embodiment.

FIG. 18 shows a block diagram of a process 1800 for improving PPA for mixed precision computations in a processing environment (e.g., a SIMD/T processing environment, such as a GPU 129, FIG. 2, FIG. 4 architecture, Graphics Pipeline 1700, etc.). In block 1810 a braiding factor is determined as a number of units of work encoded into a physical thread. In block 1820, a value of the braiding factor is determined based on a mix of precision requirements presented for individual units of work. In block 1830 units of work are classified as instructions for applied code transformation based on associated precision requirements for the processing environment. In block 1840, instruction inputs from specified registers are packed together into a destination register according to the determined value of the braiding factor. In block 1850, the packed instructions presented in vector form are executed with an instruction set architecture configured for executing packed instructions of different precisions.

In one embodiment, process 1800 may provide that multiple units of work are packed for parallel processing of multiple data elements into the physical thread for execution based on associated precision requirements for the processing environment. Process 1800 may provide that the number of units of work packed into the physical thread is determined based on compiler analysis or explicit qualification in a source language.

Process 1800 may further provide that the mix of precision requirements is presented for the individual units of work in the source language to achieve register file defragmentation. Process 1800 may further include after classifying the units of work as instructions for applied code transformation, replicating instructions for the units of work with precision requirements greater than precision requirements corresponding to the determined value of the braiding factor as multiple threads for SIMT or SIMD processing.

In one embodiment, process 1800 may provide selectively replicating and packing instructions into the physical thread for units of work with precision requirements less than a basis precision of an instruction set architecture of the processing environment. Process 1800 may include narrowing or widening operands of instructions to be applied as necessary to ensure consistent precision types of instruction inputs according to precision requirements of an instruction output. Process 1800 may further include packing instruction inputs from specified registers together into a destination register according to the determined value of the braiding factor. In one embodiment, process 1800 may include handling flow control divergence per unit of work within packed instructions with predication masks.

In one embodiment, in process 1800 handling flow control further includes: designating a predication mask for each unit of work within packed instructions to manage independent determination of branch outcomes for each unit of work; determining whether each unit of work within packed instructions is currently active or should be reactivated with the predication mask; and providing tracking information for each unit of work within packed instructions for inspection and modification by an executing program.

In one embodiment, for process 1800 the processing environment is included in a GPU of a mobile electronic device (e.g., electronic device 120, FIG. 2).

Figure 19:
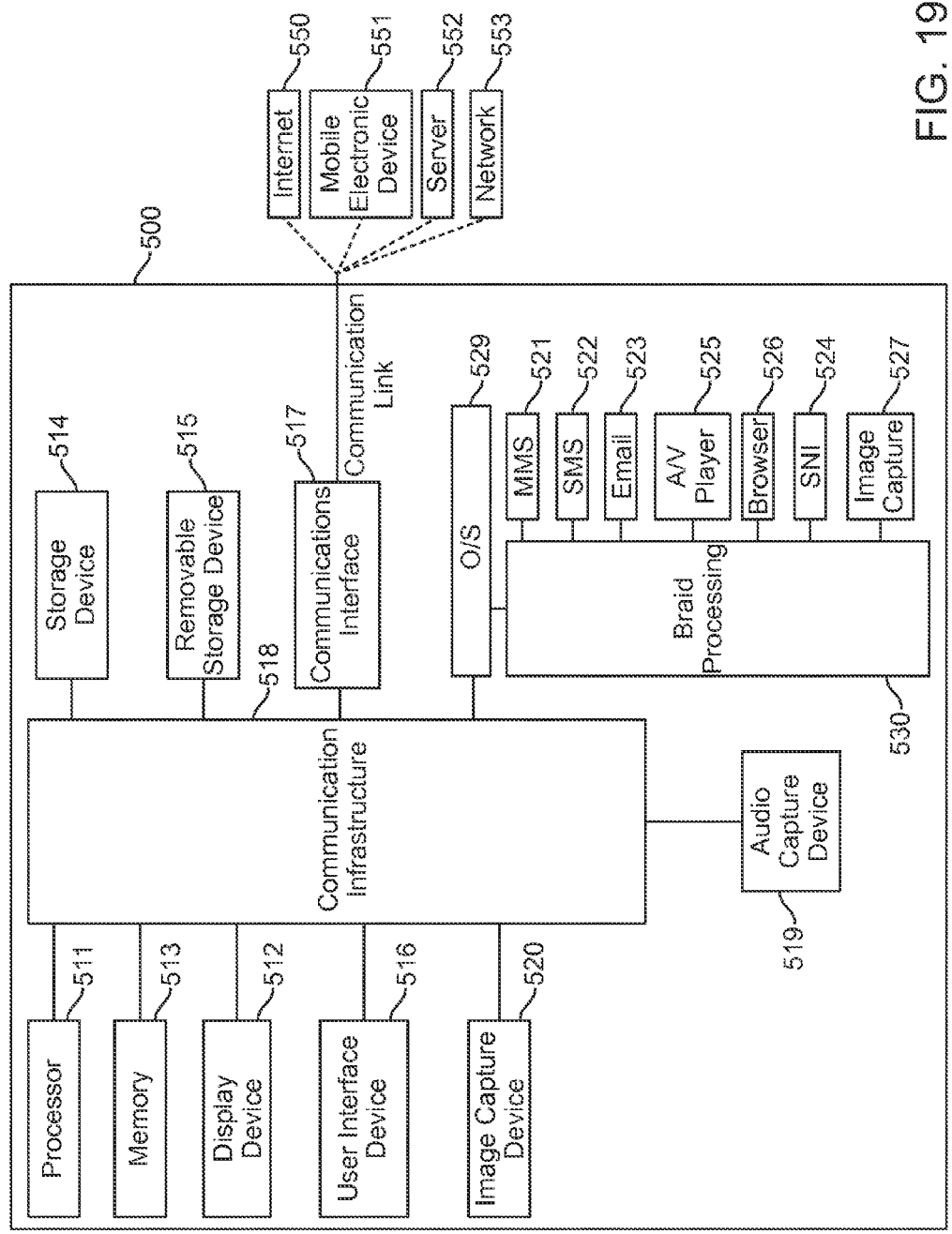
FIG. 19 is a high-level block diagram showing an information processing system comprising a computing system implementing one or more embodiments.

FIG. 19 is a high-level block diagram showing an information processing system comprising a computing system 500 implementing one or more embodiments. The system 500 includes one or more processors 511 (e.g., ASIC, CPU, etc.), and may further include an electronic display device 512 (for displaying graphics, text, and other data), a main memory 513 (e.g., random access memory (RAM), cache devices, etc.), storage device 514 (e.g., hard disk drive), removable storage device 515 (e.g., removable storage drive, removable memory interface, a magnetic tape drive, optical disk drive, computer-readable medium having stored therein computer software and/or data), user interface device 516 (e.g., keyboard, touch screen, keypad, pointing device), and a communication interface 517 (e.g., modem, wireless transceiver (such as Wi-Fi, Cellular), a network interface (such as an Ethernet card), a communications port, or a PCMCIA slot and card).

The communication interface 517 allows software and data to be transferred between the computer system and external devices through the Internet 550, mobile electronic device 551, a server 552, a network 553, etc. The system 500 further includes a communications infrastructure 518 (e.g., a communications bus, cross-over bar, or network) to which the aforementioned devices/interfaces 511 through 517 are connected.

The information transferred via communications interface 517 may be in the form of signals such as electronic, electromagnetic, optical, or other signals capable of being received by communications interface 517, via a communication link that carries signals and may be implemented using wire or cable, fiber optics, a phone line, a cellular phone link, an radio frequency (RF) link, and/or other communication channels.

In one implementation of one or more embodiments in a mobile wireless device (e.g., a mobile phone, tablet, wearable device, etc.), the system 500 further includes an image capture device 520, such as a camera of camera interface 128 (FIG. 2), and an audio capture device 519, such as a microphone 122 (FIG. 2). The system 500 may further include application interfaces, such as MMS interface 521, SMS interface 522, email interface 523, social network interface (SNI) interface 524, audio/video (AV) player 525, web browser 526, image capture interface 527, etc.

In one embodiment, the system 500 includes a braid processing interface 530 that may implement braiding similar as described above referring to FIGS. 3-7, 9-16, and the pipeline 1700 (FIG. 17). In one embodiment, the braid processing interface 530 may implement the process of flowchart 1800 (FIG. 18). In one embodiment, the braid processing interface 530 along with an operating system 529 may be implemented as executable code residing in a memory of the system 500. In another embodiment, the thread processing interface 530 may be provided in hardware, firmware, etc.

As is known to those skilled in the art, the aforementioned example architectures described above, according to said architectures, can be implemented in many ways, such as program instructions for execution by a processor, as software modules or interfaces, microcode, as computer program product on computer readable media, as analog/logic circuits, as application specific integrated circuits, as firmware, as consumer electronic devices, AV devices, wireless/wired transmitters, wireless/wired receivers, networks, multi-media devices, etc. Further, embodiments of said Architecture can take the form of an entirely hardware embodiment, an entirely software embodiment or an embodiment containing both hardware and software elements.

One or more embodiments have been described with reference to flowchart illustrations and/or block diagrams of methods, apparatus (systems) and computer program products according to one or more embodiments. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module, interface or logic, implementing one or more embodiments. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Computer program instructions representing the block diagram and/or flowcharts herein may be loaded onto a computer, programmable data processing apparatus, or processing devices to cause a series of operations performed thereon to produce a computer implemented process. Computer programs (i.e., computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system. A computer program product comprises a tangible storage medium readable by a computer system and storing instructions for execution by the computer system for performing a method of one or more embodiments.

Though the embodiments have been described with reference to certain versions thereof; however, other versions are possible. Therefore, the spirit and scope of the appended claims should not be limited to the description of the preferred versions contained herein.

What is claimed is:

1. A method for improving power, performance, area (PPA) for mixed precision computations in a processing environment, the method comprising:

determining a braiding factor as a number of units of work encoded into a physical thread prior to processing, a unit of work being a set of input data or instructions for processing;

determining a value of the braiding factor based on a mix of precision requirements presented for individual units of work;

classifying units of work as instructions for applied code transformation based on associated precision requirements for the processing environment, which comprises a single instruction multiple thread (SIMT) or a single instruction multiple data (SIMD) processing architecture;

after classifying the units of work as instructions for applied code transformation, replicating instructions for the units of work to generate replicated instructions that are identical instructions for processing by neighboring threads, wherein the replicating is done with precision requirements greater than precision requirements corresponding to the determined value of the braiding factor as multiple threads for SIMT or SIMD processing;

packing instruction inputs from specified registers together into a destination register according to the determined value of the braiding factor; and executing the packed instructions presented in vector form with an instruction set architecture configured for executing packed instructions of different precisions.

2. The method of claim 1, wherein multiple units of work are packed for parallel processing of multiple data elements into the physical thread for execution based on associated precision requirements for the processing environment.

3. The method of claim 2, wherein the number of units of work packed into the physical thread is determined based on compiler analysis or explicit qualification in a source language.

4. The method of claim 3, wherein the mix of precision requirements are presented for the individual units of work in the source language to reduce fragmentation or scattering of contents in the register file.

5. The method of claim 2, further comprising:
selectively replicating and packing instructions into the physical thread for units of work with precision requirements less than a basis precision of an instruction set architecture of the processing environment.

6. The method of claim 5, further comprising:
narrowing or widening operands of instructions to be applied as necessary to ensure consistent precision types of instruction inputs according to precision requirements of an instruction output; and packing instruction inputs from specified registers together into a destination register according to the determined value of the braiding factor.

7. The method of claim 2, further comprising:
handling flow control divergence per unit of work within packed instructions with predication masks.

8. The method of claim 7, wherein handling flow control further comprises:
designating a predication mask for each unit of work within packed instructions to manage independent determination of branch outcomes for each unit of work;

determining whether each unit of work within packed instructions is currently active or should be reactivated with the predication mask; and providing tracking information for each unit of work within packed instructions for inspection and modification by an executing program.

9. The method of claim 1, wherein the processing environment is included in a graphics processing unit (GPU) of a mobile electronic device.

10. A non-transitory computer-readable storage medium embodied thereon instructions being executable by at least one processor to perform a method for improving power, performance, area (PPA) for mixed precision computations in a processing environment, the method comprising:

determining a braiding factor as a number of units of work encoded into a physical thread prior to processing, a unit of work being a set of input data or instructions for processing;

determining a value of the braiding factor based on a mix of precision requirements presented for individual units of work;

classifying units of work as instructions for applied code transformation based on associated precision requirements for the processing environment, which comprises a single instruction multiple thread (SIMT) or single instruction multiple data (SIMD) processing architecture;

after classifying the units of work as instructions for applied code transformation, replicating instructions for the units of work to generate replicated instructions that are identical instructions for processing by neighboring threads, wherein the replicating is done with precision requirements greater than precision requirements corresponding to the determined value of the braiding factor as multiple threads for SIMT or SIMD processing;

packing instruction inputs from specified registers together into a destination register according to the determined value of the braiding factor; and executing the packed instructions presented in vector form with an instruction set architecture configured for executing packed instructions of different precisions.

11. The non-transitory computer-readable storage medium of claim 10, wherein multiple units of work are packed for parallel processing of multiple data elements into the physical thread for execution based on associated precision requirements for the processing environment.

12. The non-transitory computer-readable storage medium of claim 11, wherein:
the number of units of work packed into the physical thread are determined based on compiler analysis or explicit qualification in a source language; and
the mix of precision requirements is presented for the individual units of work in the source language to reduce fragmentation or scattering of contents in the register file.

13. The non-transitory computer-readable storage medium of claim 11, further comprising:
selectively replicating and packing instructions into the physical thread for units of work with precision requirements less than a basis precision of an instruction set architecture of the processing environment.

14. The non-transitory computer-readable storage medium of claim 13, further comprising:
narrowing or widening operands of instructions to be applied as necessary to ensure consistent precision types of instruction inputs according to precision requirements of an instruction output; and packing instruction inputs from specified registers together into a destination register according to the determined value of the braiding factor.

15. The non-transitory computer-readable storage medium of claim 11, further comprising:
handling flow control divergence per unit of work within packed instructions with predication masks.

16. The non-transitory computer-readable storage medium of claim 15, wherein handling flow control further comprises:
designating a predication mask for each unit of work within packed instructions to manage independent determination of branch outcomes for each unit of work;
determining whether each unit of work within packed instructions is currently active or should be reactivated with the predication mask; and
providing tracking information for each unit of work within packed instructions for inspection and modification by an executing program.

17. The non-transitory computer-readable storage medium of claim 10, wherein the processing environment is included in a graphics processing unit (GPU) of a mobile electronic device.

18. A graphics processor for an electronic device comprising:
one or more processing elements coupled to a memory device, wherein the one or more processing elements are configured to:
determine a braiding factor as a number of units of work encoded into a physical thread;
determine a value of the braiding factor based on a mix of precision requirements presented for individual units of work prior to processing, a unit of work being a set of input data or instructions for processing;
classify units of work as instructions for applied code transformation based on associated precision requirements for the processing environment, which comprises a single instruction multiple thread (SIMT) or single instruction multiple data (SIMD) processing architecture;
pack instruction inputs from specified registers together into a destination register according to the determined value of the braiding factor; and
execute the packed instructions presented in vector form with an instruction set architecture configured for executing packed instructions of different precisions,
wherein the one or more processing elements are further configured to: replicate instructions for the units of work with precision requirements greater than precision requirements corresponding to the determined value of the braiding factor as multiple threads for SIMT or SIMD processing, the replicated instructions being identical instructions for processing by neighboring threads.

19. The graphics processor of claim 18, wherein multiple units of work are packed for parallel processing of multiple data elements into the physical thread for execution based on associated precision requirements for the processing environment.

20. The graphics processor of claim 19, wherein the number of units of work packed into the physical thread is determined based on compiler analysis or explicit qualification in a source language, and the mix of precision requirements are presented for the individual units of work in the source language to reduce fragmentation or scattering of contents in the register file.

21. The graphics processor of claim 20, wherein the one or more processing elements are further configured to:
selectively replicate and pack instructions into the physical thread for units of work with precision requirements less than a basis precision of an instruction set architecture of the processing environment.

22. The graphics processor of claim 19, wherein the one or more processing elements are further configured to:
narrow or widen operands of instructions to be applied as necessary to ensure consistent precision types of instruction inputs according to precision requirements of an instruction output;
pack instruction inputs from specified registers together into a destination register according to the determined value of the braiding factor; and
handle flow control divergence per unit of work within packed instructions with predication masks.

23. The graphics processor of claim 22, wherein the one or more processing elements are further configured to:
designate a predication mask for each unit of work within packed instructions to manage independent determination of branch outcomes for each unit of work;
determine whether each unit of work within packed instructions is currently active or should be reactivated with the predication mask; and
provide tracking information for each unit of work within packed instructions for inspection and modification by an executing program.

24. The graphics processor of claim 18, wherein the electronic device comprises a mobile electronic device.

* * * * *